United States Patent [19]

Sidhu et al.

[11] Patent Number: 5,150,464
[45] Date of Patent: Sep. 22, 1992

[54] LOCAL AREA NETWORK DEVICE STARTUP PROCESS

[75] Inventors: Gursharan S. Sidhu, Menlo Park; Alan B. Oppenheimer, Cupertino; James E. Mathis, San Carlos, all of Calif.

[73] Assignee: Apple Computer, Inc., Cupertino, Calif.

[21] Appl. No.: 534,144

[22] Filed: Jun. 6, 1990

[51] Int. Cl.⁵ .............................................. G06F 13/00
[52] U.S. Cl. .............................. 395/200; 364/DIG. 1; 364/242.95; 364/284.4
[58] Field of Search ............... 364/200 MS, 900 MS, 364/DIG. 1, DIG. 2; 395/200

[56] References Cited

U.S. PATENT DOCUMENTS

| | | |
|---|---|---|
| 4,466,060 | 8/1984 | Riddle ............................... 364/200 |
| 4,660,141 | 4/1987 | Ceccon et al. ..................... 364/200 |
| 4,835,674 | 5/1989 | Collins et al. ..................... 364/200 |
| 4,941,089 | 7/1990 | Fischer ............................... 364/200 |

*Primary Examiner*—Thomas M. Heckler
*Attorney, Agent, or Firm*—Blakely, Sokoloff, Taylor & Zafman

[57] ABSTRACT

Method used by a first entity, typically a computer system, on a communication system for assigning itself a unique address known as a network address, which comprises a network number and a node identification number. The entity determines a unique network address for itself within a local subset of entities known as a local area network (LAN). A signal is then transmitted to determine whether a router is connected to the LAN, and if so, to determine if the network number of the address is within a range allowed by the router. If the network number is not within a range allowed by the router, then another network number is selected from a range of numbers provided by the router and another node ID are selected. It is determined whether this value is being used by any other entities in the LAN, and if so, node ID's are selected until an unused network address is ascertained. If all node ID's for an address are checked, then another network number is selected from the range and node ID's are again selected to determine a unique address. Once a unique address is ascertained, this is stored back into a parameter RAM area for a subsequent power up initialization and is used for the unique identification of the first entity.

34 Claims, 15 Drawing Sheets

LOCAL AREA NETWORK DEVICE STARTUP PROCESS

BACKGROUND OF THE INVENTION

1. Field of the Invention

The present invention relates to an apparatus and method for transferring data between a source and a plurality of receiving data processing devices. More particularly, this invention relates to assigning a unique address for each data processing and peripheral device in a local area network in order to transfer data between each of those devices.

2. Background Information

In the computing industry, it is quite common to transfer data and commands between a plurality of data processing devices, such as computers, printers, displays, terminals, and other network resources. Interconnection of computers and other peripheral devices principally developed in the early 1970s with the advent of computer networking systems which permitted the distribution of access to computing resources beyond the immediate proximity of a mainframe computer.

Recently, "local area networks" (LANs) have been developed which allow transfer of data between a localized set of computing and peripheral devices, typically in the same geographical area such as one building or a plurality of buildings closely situated together. Examples of such LANs may be found in U.S. Pat. Nos. 4,063,220, 4,661,902 and 4,689,786. In the AppleTalk ® (a trademark of Apple Computer, Inc.) network system, each "node" or computer, printer, peripheral, and other network resource, previously had a unique 8 bit identifier which allowed the node to filter out transmissions directed to other nodes. Since the 8 bit identifier, or node ID, was 8 bits in length, the number of nodes or computers and peripherals and other network resources in the LAN was limited to 254 (this number is less the values where all the bits are set and all of the bits are clear, which are reserved). This has resulted in a limitation in the utility of such LANs, since an expansion beyond the 254 node limit required the connection of additional hardware to the system, such as network routers and/or other hardware devices. This resulted in an increase of the complexity of the local area network, as well as an increase in its cost.

As will be described, the present invention provides a local area network for communication and resource sharing among various computers, servers, disks, printers, modems, and other data processing devices, peripherals and network resources, which increases the current 254 node limit to nearly $2^{24}$ or approximately 16 million nodes while remaining compatible with earlier non-extended local area networks which may still be connected to it through network routers. Specifically, this invention relates to an assigning of a unique node address to a node during node power-up or restart in such a way that previous network applications and devices continue to work without modification.

SUMMARY AND OBJECTS OF THE INVENTION

One of the objects of the present invention is to provide an efficient way to assign a unique protocol address to an entity on a communication system, ensuring that no other entity on the communication system is using the particular protocol address.

Another object of the present invention is to remain compatible with existing networking systems while accomplishing the goal of assigning a unique protocol address to an entity.

These and other objects of the present invention are provided for by a method used by a first entity for assigning itself a unique address on a communication system, by determining whether a first value has been stored in a first storage means. If so, the first value is stored in a second storage means, and a first signal is transmitted to determine if the first value is used for the unique identification of another entity. If the first value is used for the unique identification of said another entity then a second signal is received within a first predetermined amount of time and a second value is stored in the second storage means. These two steps are repeated until a second signal is not received or all possible first values have been stored in the second storage means, wherein the first and second values have a network number portion and a node ID portion, and the network number portion of the two values are equal. On each iteration of the steps, the second value becomes the first value. If the first value has not been stored in the first storage means, the first value has been stored in the first storage means and the second signal is received, or if all possible values of the first value have been stored in the second storage means, then a third value is stored in the second storage means, and a third signal is transmitted to determine if the third value is used for the unique identification of said another entity. If the third value is used for the unique identification of said another entity then a fourth signal is received and a fourth value is stored in the second storage means. These steps are repeated until the fourth signal is not received or until all possible third values have been stored in said second storage means. A fifth signal is then transmitted to request information from a routing means coupled to a local subset of the communication system, wherein the subset includes the first entity and said another entity. If a sixth signal is received from the routing means within a second predetermined period of time, wherein the sixth signal includes a list of valid network numbers for the local subset of the communication system, and the value contained within the second storage means is not in the list of valid network numbers provided by the sixth signal, then a fifth value is stored in the second storage means, the fifth value being in the list of valid network numbers provided in the sixth signal. Then, a seventh signal is transmitted to determine if the value contained in the second storage means is used for the unique identification of said another entity. If the value contained in the second storage means is used for the unique identification of said another entity then an eighth signal is received and a sixth value is stored in the second storage means. These steps are repeated until the eighth signal is not received or until all possible sixth values have been stored in said second storage means, the sixth value being in the list of valid network numbers provided in the sixth signal. The value contained in the second storage means is then stored into the first storage means.

In a particular embodiment of the invention, a plurality of entities and routers are interconnected in a computer controlled communication system which allows for the transfer of data between the plurality of entities in one local subset of the system and also allows the transfer of data between an entity in one local subset of the communication system and an entity in another local subset of the communication system through the routers. One set of entities is typically located on one local subset and another set of entities is typically located on another local subset of the communication system. Each local subset of the communication system is provided with a list of valid network numbers which are unique for that subset as compared to the entire communication system. According to the method and apparatus of the present invention, upon start-up, entities on a particular local subset of the communication system first randomly generate network values and node values and determine whether these values are unique on the local subset and then subsequently query the router directly connected to the particular local subset to determine whether the network values are within the valid list provided for the particular local subset of which the entity is part. The routers for each subset (network) in the internet typically include a first router which is seeded with a list of valid network values for a particular local subset and then the remaining routers in the local subset are allocated that list of network numbers so that each local subset will have a unique list of valid network numbers.

According to the method and apparatus of the invention, an entity on a particular local subset of the communication system first determines whether a value has been stored which represents a previously saved address for that particular entity in the communication system. This value will typically include a network value and a node value and is typically saved in a memory means which saves information even if power is lost or turned off (e.g. battery backed up parameter RAM). If a previously saved address has not been stored then the first entity will typically store a randomly generated value in a storage means (e.g. RAM), which randomly generated value is representative of a first randomly generated address which includes a network value and a node value. In either case then the entity transmits an enquiry signal to determine if the value which has been randomly generated is used for the unique identification of any other entity on the local subset of the communication system. If that value is being used for the address—and hence the unique identification—of any other entity on the local subset, then the entity will receive an acknowledge signal from the other entity which has already used the address; this acknowledge signal will indicate to the entity that the entity's first value for an address in the communication system is not available as it is being used as an address for another entity on the local subset of the communication system. Having received this acknowledge signal, the entity then generates another random value and stores it in a storage means; this random value is a second randomly generated address and includes a network value and a node value. This process will continue as the entity attempts to find a combination of the network value and the node value which is unique within the local subset of the communication system.

If a unique address is found on the local subset, the entity then transmits a signal requesting information from a router means which is directly connected to the local subset of the communication system. The request for information from a router means includes a request to determine if a router exists and includes a request to determine the list of valid network values which are permitted for the particular local subset on which the requesting entity resides. The request for information from a router also includes a request for information concerning the zones which are permitted for the particular local subset on which the entity resides. If a router is directly connected to the local subset, the router will respond within a predetermined period of time with the requested information so that the entity receives a signal indicating the list of valid network values for the local subset on which the entity resides. If the entity waits a predetermined period of time for the response from a router and if no response is received, then the entity sets its tentative address as the final address of the entity in the communication system. If the router responds within a predetermined period of time then the entity determines whether its tentative address which has been randomly generated as described above includes a network value which is within the valid list of network values. If the network value is not within the list of valid network values indicated by the router, then the entity generates another random address which includes a network value which is randomly generated within the list of valid network values and a randomly generated node value. As will be described below these values are randomly generated. This address will be tested to determine if it specifies a unique address for the entity among the addresses used by the other entities on the local subset. This process continues until the entity has obtained a unique address which is in the list of valid network values to use as a final address or until the entity determines that there are no other addresses available, in which case an error condition is indicated and the process stops.

BRIEF DESCRIPTION OF THE DRAWINGS

The present invention is illustrated by way of example and not limitation in the figures of the accompanying and in which like references indicate similar elements and in which.

DETAILED DESCRIPTION OF THE PREFERRED EMBODIMENT

A local area network node startup method for assigning a unique address is described. In the following description for the purposes of explanation, specific numbers, bytes, registers, addresses, times, signals, and formats are set forth in order to provide a thorough understanding of the present invention. However, it will be apparent to one skilled in the art that the present invention may by practiced without the specific details. In other instances, well known circuits and devices are shown in block diagram form in order to not unnecessarily obscure the present invention.

Figure 1:
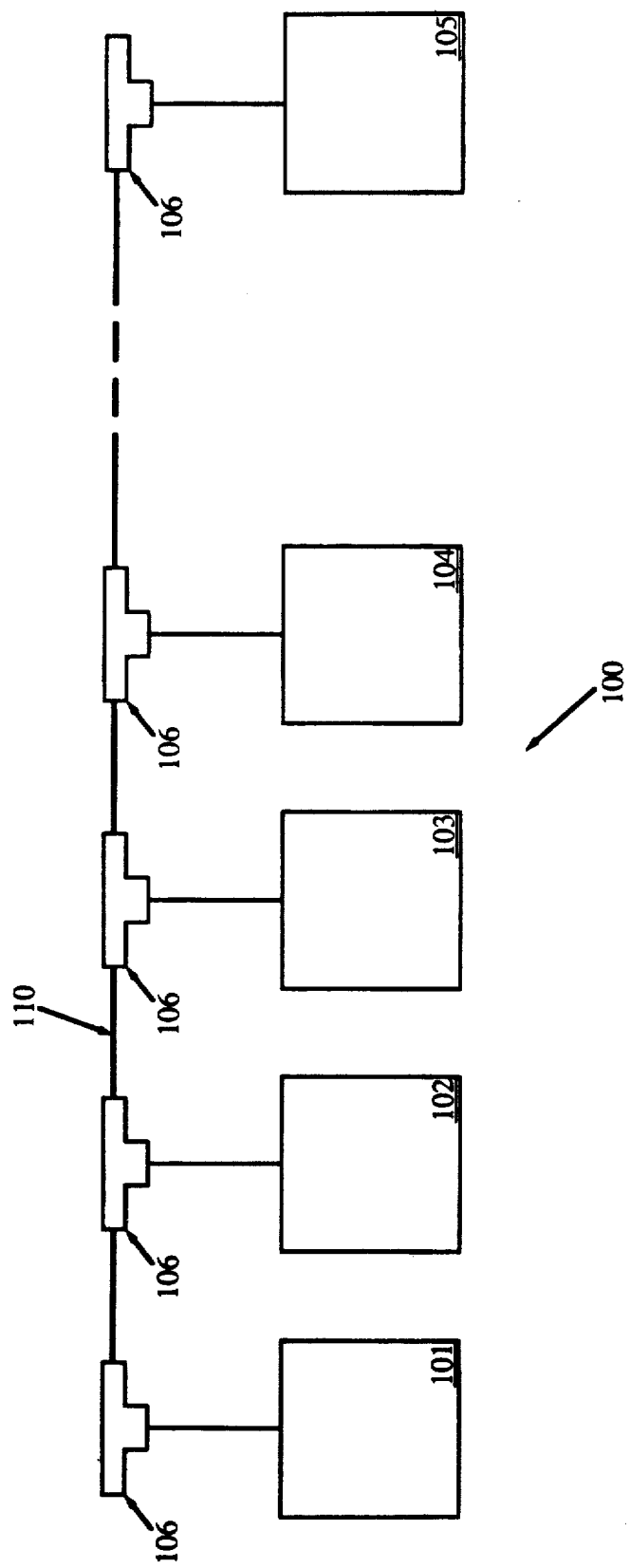
FIG. 1 shows a local area network (LAN) on which the preferred embodiment of the present invention is implemented.

Referring to FIG. 1, the present invention may include a plurality of data processing devices or network resources identified generally by the numbers 101 through 105. These network resources may include, among other things, printers, modems, memory, disk devices, etc. For the purposes of this specification, all data processing and peripheral devices which are coupled to the network are collectively referred to as "entities". As shown, the entities 101 through 105 are interconnected for data transfer to one another by common cable 110. The entities are coupled to cable 110 by connection modules 106 on FIG. 1. It will be appreciated by one skilled in the art that cable 110 may comprise any shared media, such as co-axial cable, fiber optics, radio channel, twisted pair cable, or the like. The present invention permits access to various network resources such as data stored in local memories or disk and the common use of printers without the need to predefine addresses for each device coupled to cable 110.

Note that the network 100, shown in FIG. 1, in the preferred embodiment may be an ETHERNET (U.S. Pat. No. 4,063,220) standard networking system, under the Institute of Electrical and Electronic Engineers (IEEE) specification 802.3, or in an alternative embodiment of token-ring standard networking system under IEEE 802.5 or any other type of networking system such as fiber distributed data interface (FDDI) networking system. As is known in the art, the ETHERNET networking system is capable of transmission at rates of approximately ten megabits per second and belongs to the class of LAN's known as CSMA/CD (carrier sense multiple access with collision detection) systems. Using the CSMA/CD protocol, each data processing device 101-105 may not transmit on the network cable 110 as long as traffic is present (i.e. another node is already transmitting on cable 110). As soon as a node detects that cable traffic has ceased on cable 110, the node will wait for a certain mandatory time period to pass to allow the network to settle, and then the node will begin to transmit its data. This CSMA/CD protocol is used in conformance with IEEE specification 802.3.

In an alternative embodiment, network 100 may be a standard token-ring networking system. In this case, networking cable 110 further couples nodes 101 and 105 directly so that the network 100 forms a complete loop. Data travels unidirectionally in the network 100 at a data rate of approximately four to sixteen megabits per second. Each connection module 106 is a "repeater," that is, when data is received from an adjoining node "upstream" from the receiving node, the token is placed back on the network cable 110. This is done after the node has examined the token to see if the node must act upon the token, and transform it accordingly, if required. In this alternative embodiment for network 100, the token-ring topology is driven in accordance with IEEE 802.5 specifications.

Figure 2:
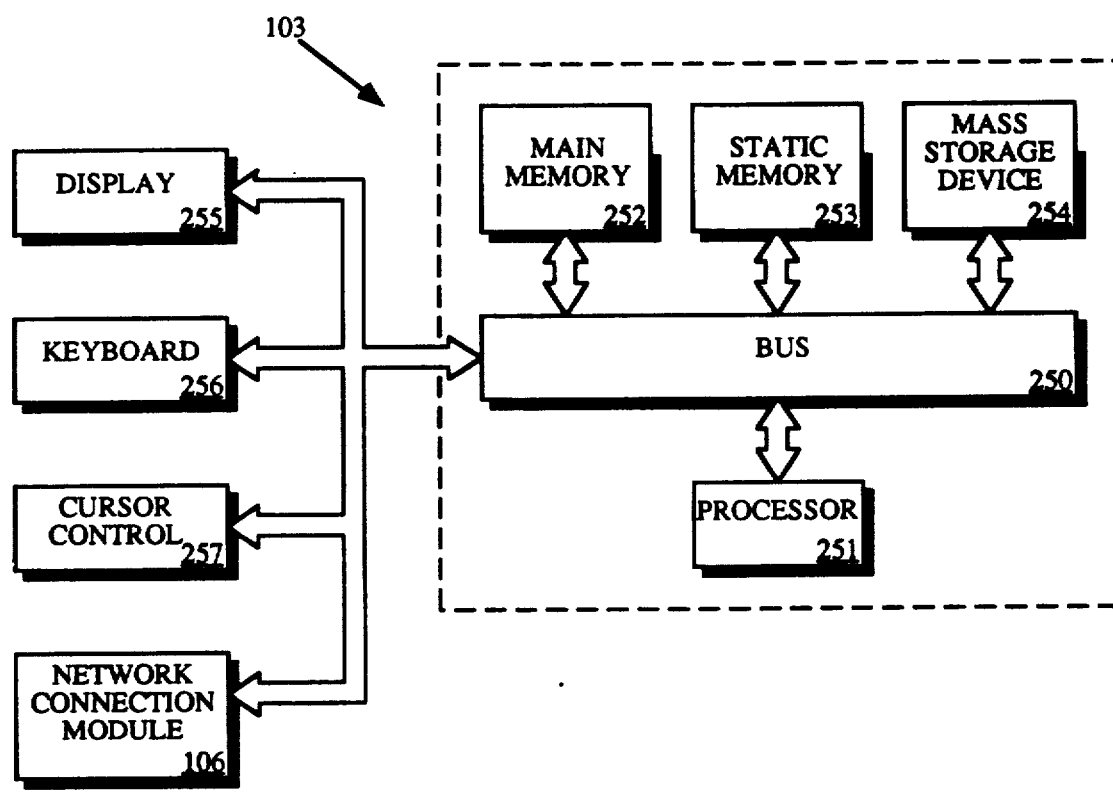
FIG. 2 shows a detailed representation of one computer in the Local Area Network.

FIG. 2 illustrates one node on network 100, for instance 103, which may be a computer system upon which the preferred embodiment of the present invention is implemented. Computer system 103 comprises a bus or other communication means 250 for communicating information, a processing means 251 coupled with bus 250 for processing information, a random access memory (RAM) or other dynamic storage device 252 (commonly referred to as main memory) coupled to bus 250 for storing information and instructions for processor 251. Computer system 103 also comprises a read only memory (ROM) and/or other static storage device 253 coupled to bus 250 for storing static information and instructions for the processor 251, a data storage device 254, such as a magnetic disk or optical disk and disk drive, coupled to bus 250 for storing information and instructions. Computer system 103 further comprises a display device 255, such as a cathode ray tube (CRT), coupled to bus 250 for displaying information to the computer user, an alpha-numeric input device 256, including alpha numeric and other keys, coupled to bus 250 for communicating information and command selections to processor 251, and may also comprise a cursor control device 257, such as a mouse, a track ball, or cursor direction keys, coupled to bus 250 for communicating direction information and command selections to processor 251 and for controlling cursor movement. Computer system 103 may also be coupled to connection module 106 via bus 250.

In the preferred embodiment computer system 103 is one of the MACTINTOSH family of personal computers, such as the MACINTOSH SE or MACINTOSH II manufactured by Apple Computer, Inc. of Cupertino, Calif. Processor 251 is one of the 68000 family of microprocessors manufactured by Motorola, Inc. of Schaumburg, Ill.

A description of some of the foregoing may be found in *Inside AppleTalk* ®, by Gursharan Sidhu, Richard F. Andrews, and Alan B. Oppenheimer (1st Ed. 1989) published by Addison-Wesley.

Figure 3:
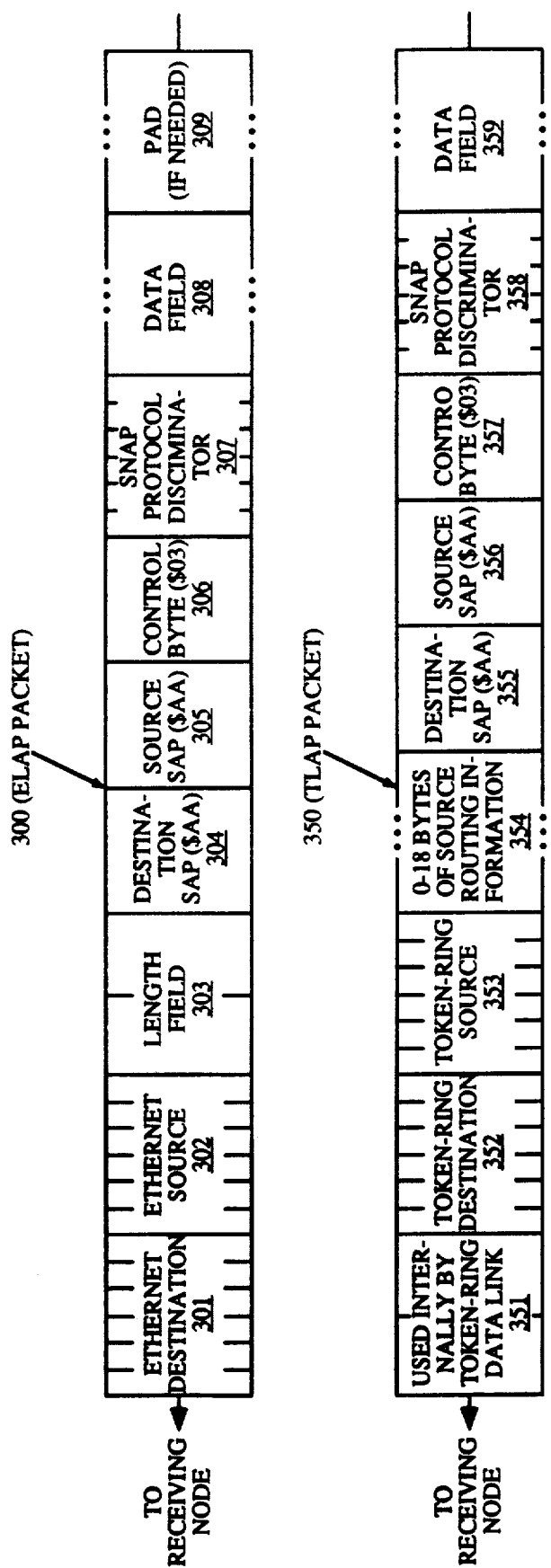
FIG. 3 shows packets used for transmission of data between nodes in the preferred embodiment.

Referring now to FIG. 3, the present invention utilizes a basic unit of transmission known as a "frame". Two frames are shown in FIG. 3. Frame 300 is an extension of the "ETHERNET" network standard packet, and uses a protocol known in the present preferred embodiment as the "ETHERTALK Link Access Protocol" or ELAP. Frame 350 is an extension of the "Token-ring" standard packet and uses a protocol in an alternative embodiment known as the "TOKENTALK Link Access Protocol" or TLAP. For the purposes of the remainder of this application, each byte is 8 bits in length. Depending on whether network 100 in the preferred embodiment is an ETHERNET or Token-ring network system in the alternative embodiment, the corresponding packet will be used. In other words, if the network 100 is an ETHERNET, the packets transmitted are in the format of an ELAP packet, frame 300. If network 100 in an alternative embodiment is a Token-ring network, the packets transmitted are in the format of a TLAP packet, frame 350.

To understand the two packets (frames) shown in FIG. 3, it is necessary to understand the concept of a Service Access Point (SAP). SAP's are defined in the IEEE 802.2 specification and are used to differentiate between protocol stacks used in a given node. Since the currently performed embodiments use slightly different data packets than standard ETHERNET and Token-ring networking systems, the SAP quantities 304 and 305 in frame 300, and 355 and 356 in frame 350 are represented with the values $AA. This informs the hardware and software that certain non-IEEE standard protocol software is being used in networking system 100. Note that for the remainder of this application certain values will be represented in hexadecimal notation (base 16). These values are preceded by a "$."

In the present system, notice that it is also necessary to distinguish between the various protocol families used since the SAP quantity merely identifies that the packet being sent is in a non-IEEE standard format. Therefore, the present embodiment uses an additional five-byte quantity known as the Sub Network Access Protocol or SNAP. The SNAP quantity is shown in FIG. 3 as 307 in frame 300, and 358 in frame 350. This SNAP quantity identifies the particular subprotocol being used in the packet. The SNAP quantity will vary according to which particular protocol stack the packet corresponds. The values contained within these SNAP fields are discussed below.

In the preferred embodiment for an ETHERNET network 100, the frame 300 comprises a header comprising the elements 301, 302, and 303. 301 is known as the ETHERNET destination address. This address is 6 bytes in length and indicates the ETHERNET destination address of the node to which the packet is directed. 302 is also 6 bytes in length and is known as the ETHERNET source address indicating the source node from which the packet has been transmitted. In both the ETHERNET system and the Token-ring system, these 6-byte quantities are static hardware addresses residing in connection modules 106 in network 100. 303 in frame 300 is known as a length field and specifies the total length of the data that follows. The next three fields of frame 300 are known as the IEEE 802.2 header. This header specifies the source and destination SAPs being used, and a control byte indicating the type of packet. The destination and source SAP fields 304 and 305 in frame 300, as discussed above, are both equal to $AA. These values indicated that it is a non-standard IEEE protocol being used by both the destination and source nodes for the addresses given in 301 and 302. The third portion 306 of the 802.2 header is known as a control byte and it contains the value $03, indicating an 802.2 data packet is being used. The next five bytes in frame 300 are known as the SNAP protocol discriminator and indicates to the data link the type of packet being transmitted. For instance, for a standard AppleTalk ® protocol discriminator, field 307 contains the value $080007809B. For an AppleTalk ® Address Resolution Protocol (AARP) packet the value is $00000080F3. AARP is discussed below.

The next two fields of a standard ELAP packet in frame 300 is the data field 308 and a padding field 309. The data field 308 contains certain data, depending on the particular protocol being implemented and the type of packet being transmitted, which will be discussed below. This may include the source and destination protocol addresses as well as any data. Finally, the last field in frame 300 is a padding field, and is used if the packet does not equal the minimum 60 bytes of information required for an ETHERNET packet. Therefore, if frame 300 is less than the minimum 60 bytes in length, bytes are inserted into the pad field 309 until the packet equals 60 bytes in length.

In an alternative embodiment implementing the token-ring architecture for network 100, TLAP frame 350, as shown in FIG. 3, is used as the standard transmission packet. Frame 350 first comprises a TLAP header comprising 8 fields. The TLAP header starts with a field 351 being a unique 2 byte identifier for use within the Token-ring network. The next 6 bytes are used for the Token-ring node destination address 352, and the following 6 bytes are used for the Token-ring node source address 353 for the node transmitting the packet. As in the ETHERNET system, the 6 byte node hardware addresses in fields 352 and 353 are statically assigned to each of the nodes comprising network 100. The following field 354 may be 0 to 18 bytes long and comprises source routing information. This information is used by the Token-ring networking system if the high order bit of the source hardware address 353 is set. If that bit is not set, then field 354 is 0 bytes in length, and there is no routing information contained in the packet. However, if the most significant bit of 353 is set, then the routing information may comprise 2 to 18 bytes of source routing information indicating which bridges in the network the packet 350 must traverse in order to reach the destination node specified in field 352.

The next three fields, 355, 356 and 357 of the TLAP packet 850 is the IEEE 802.2 specification header. Each field comprises one byte of information. Fields 355, 356 and 357 contain the same values as fields 304, 305 and 306 in the ELAP 802.2 header of frame 300. The destination SAP field 355 contains $AA, the source SAP field 356 contains $AA, and the control byte 357 is set equal to $03, indicating that it is a data packet being transmitted. The next field 358 of the TLAP packet 350 is the SNAP protocol discriminator comprising six bytes. Again, this field contains the same value as 307 in frame 300 depending on the type of packet being transmitted. The remainder of the frame 350 comprises a data field 359, which will contain certain information as in ELAP field 308.

Figure 4:
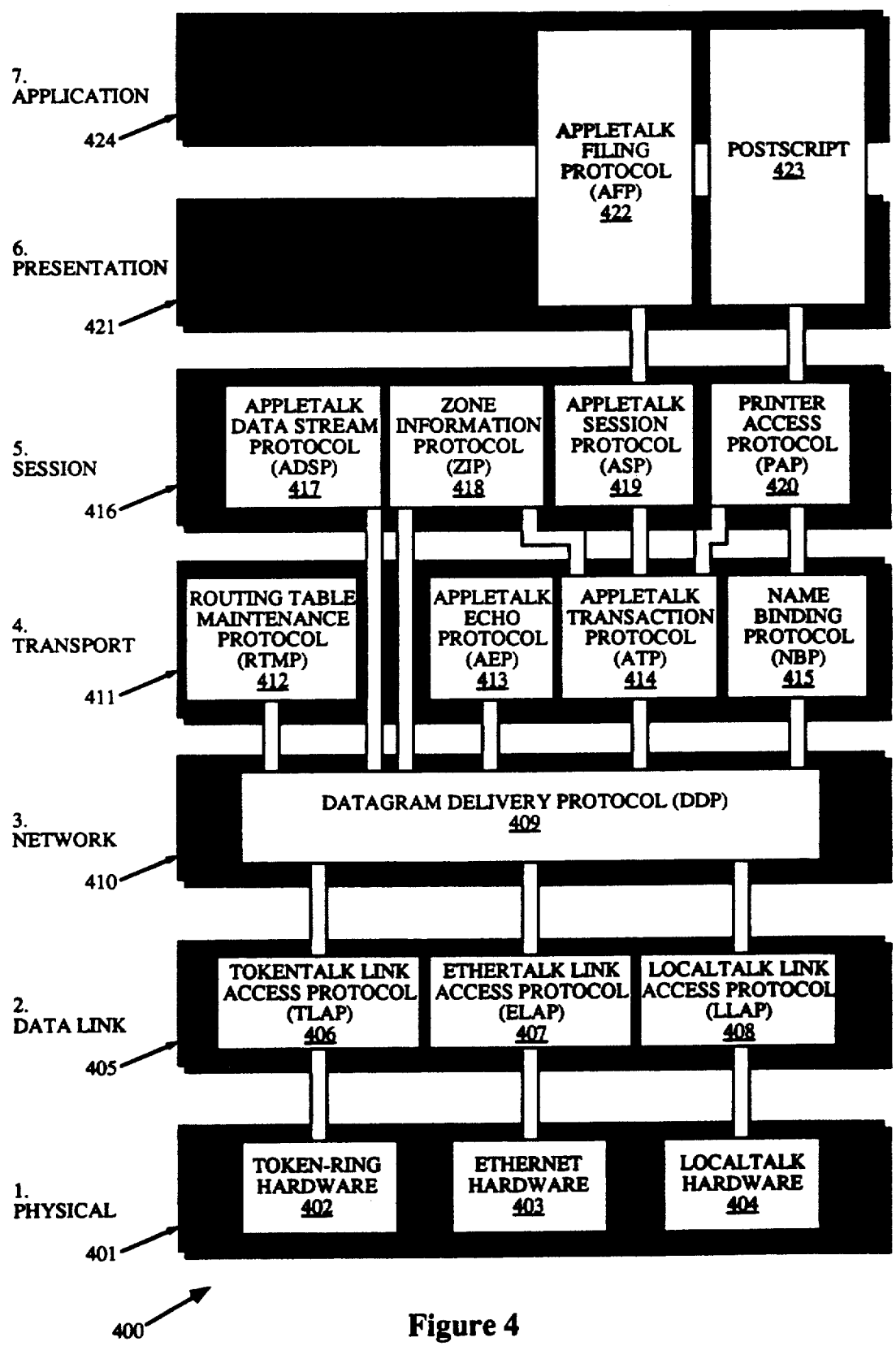
FIG. 4 shows a representation of the various protocol stacks used in the preferred embodiment.

Referring to FIG. 4, an example of the layers of protocols used in the present invention is shown as 400. The diagram shown in FIG. 5 as 400 shows the presently preferred embodiments as corresponding to the International Standards Organization (ISO) and the Open Systems Interconnection (OSI) reference model (the ISO-OSI reference model). This model defines the concepts of a protocol and a service interface that defines a protocol architectural framework consisting of 7 layers comprising: Physical 401, Data Link 405, Network 410, Transport 411, Session 416, Presentation 421, and Application 424. Each layer may be thought of as a separate process or filter which either appends protocol information onto existing data packets transmitted in system 100, or routes appropriate data packets through network system 100 depending on the type of packet and the particular layer in which the packet resides. The various layers allow packets to be transmitted from one variety of hardware to another, and one process (socket) to another. For instance, the packets described with reference to FIG. 3, frames 300 and 350, which employ the ELAP and TLAP protocols, are utilized at the data link 405 layer of the networking system which have been translated from the network layer 410 portion of the networking system, using the Datagram Delivery Protocol 409 (DDP). Protocols such as Routing Table Maintenance Protocol (RTMP) 412, the AppleTalk ® Echo Protocol 413 (AEP), Zone Information Protocol (ZIP) 418, and the AppleTalk ® Filing Protocol (AFP) 422 reside at the higher levels in the protocol "stack" such as 411, 416, 421, and 424.

Figure 5:
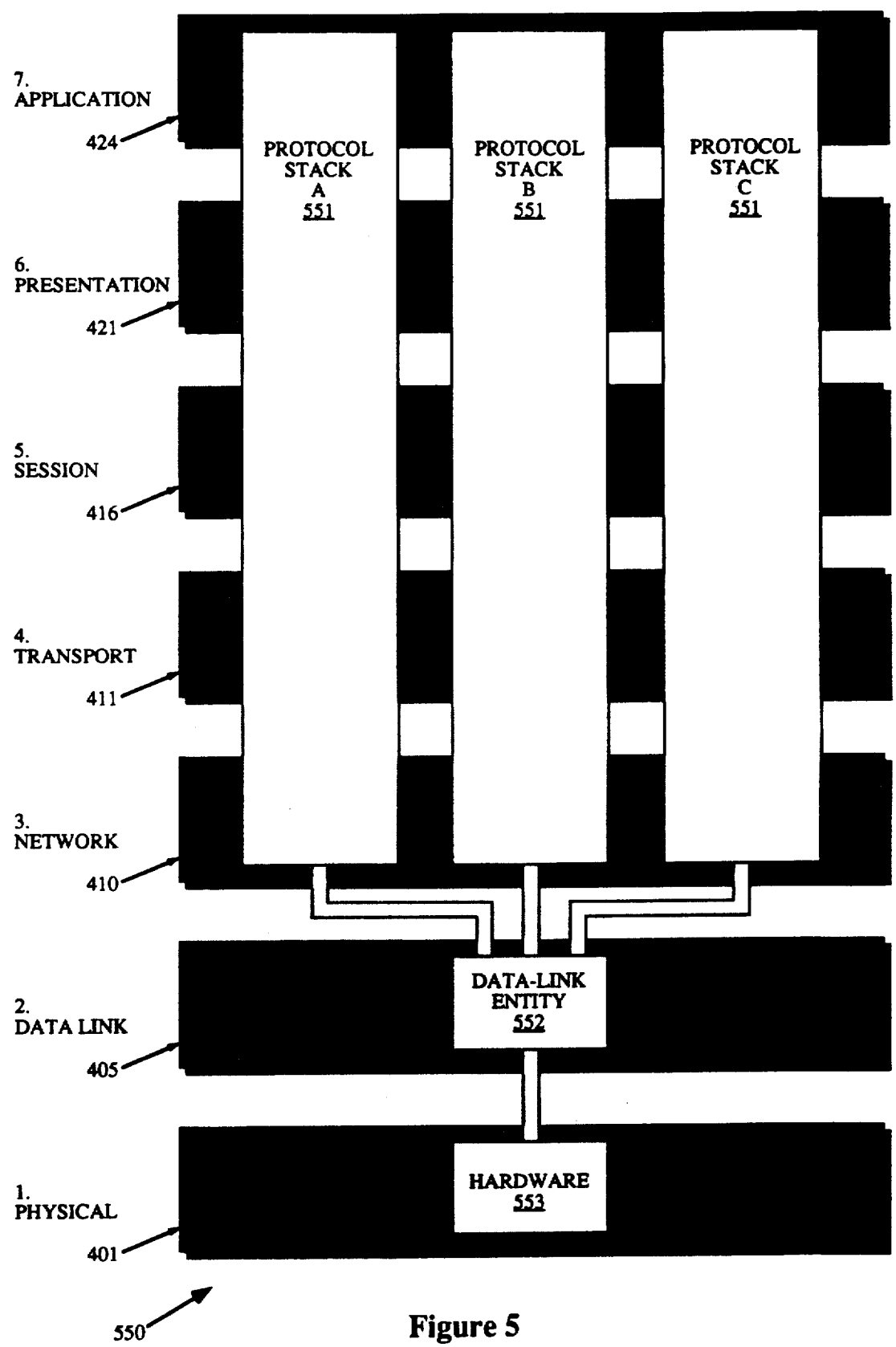
FIG. 5 shows the protocol stacks and data link organization as it relates to translation of protocol addresses into hardware addresses in the preferred embodiment.

Referring to FIG. 5, the present invention utilizes a scheme known as "address resolution" which converts an address used in a high level stack from a protocol address to a hardware address of a particular node on the LAN. This high level address generally resides in layer 410 of the protocol stacks 551. Each of these protocol "stacks" correspond with the protocol layers shown on FIG. 4 as Network 410, Transport 411, Session 416, Presentation 421 and Application 424. For instance, each protocol stack may incorporate a different set of high level protocol addresses corresponding to the specific instance of that stack for the given nodes. As shown in 550 of FIG. 5, the protocol stacks A, B, and C 551 use data link entity 552 to resolve those protocol addresses into hardware addresses used at level 553. In the preferred embodiment, the address resolution from the high level protocol stacks 551 to the data-link entities such as ELAP or TLAP residing at level 552 in the ISO-OSI model is performed by a process known as the AppleTalk ® Address Resolution Protocol, or AARP. In order to resolve protocol addresses residing at levels 551 and 552 into hardware addresses used at level 553, AARP expects certain packets from nodes in network 100. The packets expected by AARP are shown in FIG. 6.

Figure 6:
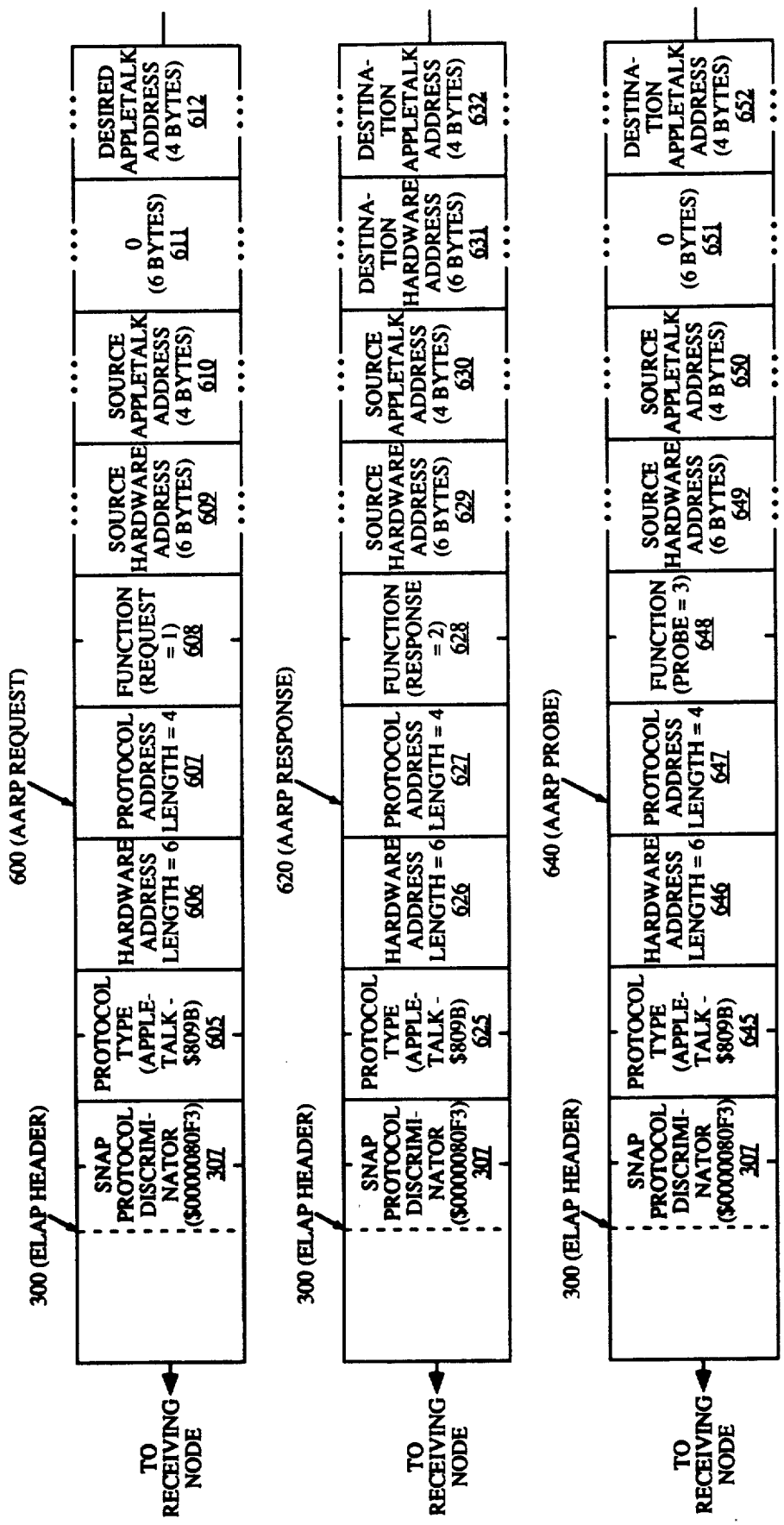
FIG. 6 shows address resolution protocol packets which are used in the preferred embodiment for determining the availability of certain protocol addresses.

FIG. 6 shows the three types of packets which may be used in AARP. As shown in FIG. 6, each of packets 600, 620, and 640 contain similar information, with some exceptions. The packets 600 (fields 605–612), 620 (fields 625–632), and 640 (fields 645–652) each constitute the data field 308 portion of ELAP packet 300 for transmitting the packet to the appropriate node in network 100. The ELAP packet 300 is used for ETHERNET hardware in the preferred embodiment, but packet 350 may be used for Token-ring hardware in an alternative embodiment wherein packets 600, 620 and 640 will reside in field 359. The SNAP protocol discriminators 307 in ELAP packet 300 should contain $00000080F3 to indicate that it is an AARP packet being transmitted. The protocol type fields 605, 625, and 645 contain $809B for each of the packets. This indicates to the hardware that an AppleTalk ® protocol address is being used.

Packets 600, 620, and 640 each comprise fields indicating a hardware address length 606, 626, and 646, and a protocol address length 607, 627, and 647. The hardware address length 606, 626, and 646 are constant for the three packets since the hardware addresses in the currently performed embodiments are each six bytes in length. The protocol address length contained in fields 607, 627, and 647 are the same for packets 600, 620, and 640 because the protocol address length in the present invention is always equal to four bytes.

The next field in packets 600, 620, and 640, is a two-byte function field indicating the type of AARP packet being transmitted. In 600, 608 contains a one, indicating that it is an AARP request packet being transmitted. In 620, the function field 628 contains a two, indicating that it is an AARP response packet. In 640, the function field 648 contains a three, indicating that it is an AARP probe packet. The AARP probe packet 640 is used to determine whether the address is currently being used by another node on the network. This probing function is discussed below. The next two fields in AARP packets 600, 620, and 640 are the source hardware address 609, 629, and 649, and the source protocol address 610, 630, and 650. The source hardware address 609, 629, and 649 is the static ETHERNET address which resides in the ETHERNET hardware. The source protocol address 610, 630, or 650 is the address maintained by the node as the current protocol address used by the layer 411 of the network model shown in FIG. 4 in order to communicate with the node.

As mentioned previously, the AARP protocol facilitates a mapping between addresses in the stack layers 551 and 552 in FIG. 5 to hardware addresses used in ETHERNET or token-ring layer 553 (ELAP 406 or TLAP 407). This address mapping is accomplished by the AARP process in each node maintaining an Address Mapping Table (AMT). An AMT is a list of hardware addresses (which are statically assigned to each node) along with corresponding protocol addresses for each protocol family used in network 100. When asked by a client (process) to determine a hardware address corresponding to a given protocol address, AARP scans the AMT in the node for that protocol address. If the protocol address is found in the AMT, AARP reads the corresponding hardware address and delivers it to the requesting client.

If the hardware address is not found in the AMT, then AARP tries to determine the hardware address by querying all nodes supporting the corresponding protocol family. This particular process is accomplished by using an AARP request 600 shown in FIG. 6. Whenever a new address mapping is determined, new AMT entries are entered for that specific protocol to correspond with the given hardware address. Old AMT mappings between hardware addresses and protocol addresses are purged using a least recently algorithm, and AMT entries are modified if given protocol or hardware addresses are modified.

If a request packet 600 or a probe packet 640 is sent and an AARP response 620 is received by the transmitting node, then the destination hardware address 631 can be placed into the AMT for the protocol address transmitted in the packet. From that point forward, the node may use the AMT to send a packet (datagram) to the node's hardware address directly without performing any address resolution between a protocol address and a hardware address. If a response packet is not received within a specified time interval after re-transmitting for a specified number of times the AARP probe 640 or request packet 600, then the transmitting node leaves that entry in its AMT blank. The failure to respond within a given time indicates that no node is using the protocol address.

Every time a packet is received from another node in the system, address information may be obtained by AARP since both the hardware address and protocol address is provided in ELAP packet 300. The method of updating AMT entries in this way is known as "gleaning". Some processes, at their option, may not perform address "gleaning" due to the overhead associated with updating address information every time a packet is received.

The source protocol address 610, 630, and 650 in the packet is provided by the node using a mapping in the AMT if the node knows what its corresponding protocol address is. At the time of dynamic address assignment, the source protocol address field 650 of packet 640 is set to the address which is being determined whether unique or not. In an AARP request packet 600 or an AARP response packet 620, fields 610 and 630 should contain the protocol address of the requesting or responding node.

The next fields 611, 631, and 651 are each six bytes in length and are not used in packets AARP request 600 and AARP probe 640. In AARP response packet 620, the destination hardware address is provided in field 631.

In packets 600, 620, and 640, each field 612, 632, and 652 is used to transmit a requested or destination protocol address by a transmitting node. This protocol address is four bytes in length. In an AARP request 600, the protocol address for which a hardware address is desired is transmitted in field 612. In an AARP response packet 620, field 632 is used to transmit the protocol address for the node with the hardware address transmitted by an AARP request packet 600 or an AARP probe packet 640. In packet AARP probe 640, a tentative protocol address 652 comprises the last four bytes of the packet. A tentative protocol address 652 is transmitted by a node during system power-up to determine if the protocol address is in use by any other node on the network. When such a probe is made, any node having a protocol address equal to the value contained within field 652 will transmit an AARP response packet 620 containing the same protocol address in field 630 and the corresponding hardware address in field 629. This indicates to the probing node that the protocol address is not available for use.

Figure 7:
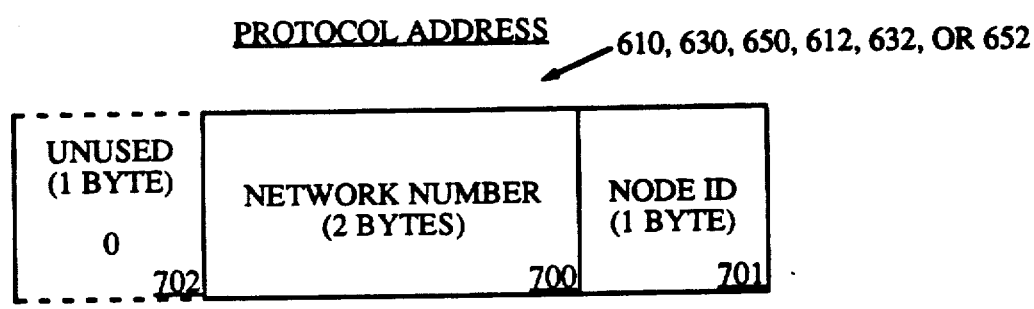
FIG. 7 shows a detailed representation of a protocol address used in data packets in the preferred embodiment.

Referring to FIG. 7, a detailed representation of the protocol addresses shown as 610, 630, 650, 612, 632, or 652 on FIG. 6 is shown. Notice that the address is broken into 3 distinct fields 700, 701, and 702. Notice that the field 702 (one byte in length) is not used at this time and must be set to zero. 700 is a two byte field which contains a "network number." The network number 700 represents a specific subset of nodes in a network 100. In the prior art, the network number represented all of the nodes on network 100 separated from the remainder of the internet by a device known as an internet router (IR). The network number 700 in the currently performed embodiments now simply represents a subset of nodes on network 100. Node ID 701 comprises a single byte, and represents a unique node within the subset of nodes indicated by network number 700. As mentioned previously, byte 702 is currently unused at this time, although space has been provided in the design of the present preferred embodiment to extend the 24 bit protocol address (network number 700 concatenated with the node ID 701) to a 32 bit value. Note that this protocol address, referred to in FIGS. 6 and 7, represents an address generated by one of the protocol stacks 551 of FIG. 5, specifically the AppleTalk ® protocol stacks 400 shown in FIG. 4. These protocol addresses, as mentioned previously, are translated by AARP, into a six byte hardware address to be used at level 553 shown in FIG. 5 to build the ELAP header 300 or TLAP header 350.

Figure 8:
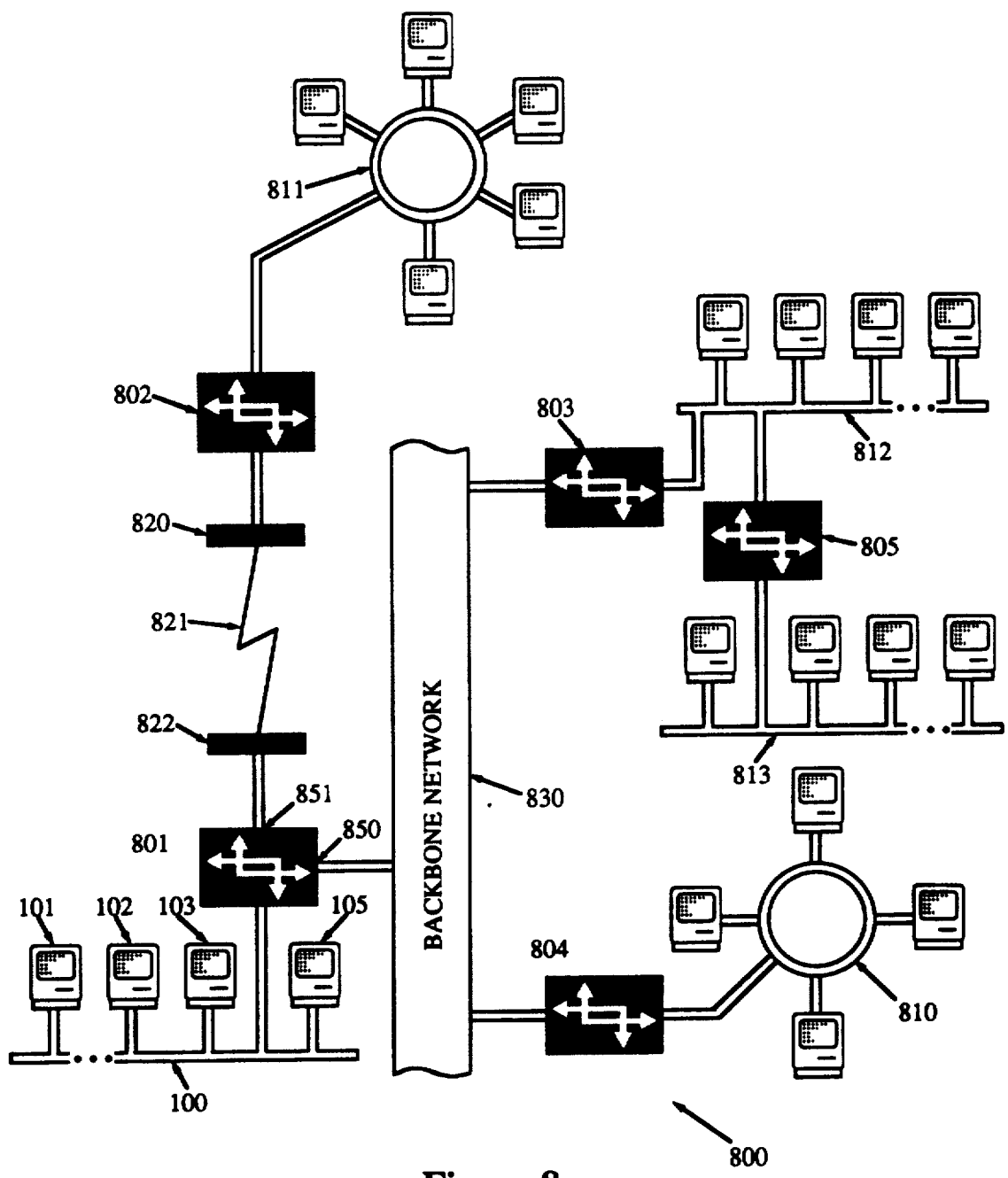
FIG. 8 shows an internetwork which connects several local area networks in the preferred embodiment, including routers used for routing information from one local area network to another.

A network 100 may be extended in a manner shown in FIG. 8. As is shown on FIG. 8, network 100 may be interconnected with several other networks making one large "internet" 800. For instance, router 801 can appear as node 104 through one of its ports 852 shown on FIG. 8. A router or internet router (IR) is a hardware device used for routing information from one network to another. A router, such as 801, 802, 803, 804 or 805, is used to connect several LANs onto an internet and distribute signals or data packets among the various local area networks. A router is a node with multiple ports and the ability to receive and forward packets between ports. It typically is a high performance computer to facilitate fast and efficient datagram routing within the network. It is known as a "store-and-forward" device, since it will store a datagram for a brief period of time and retransmit the packet through one of its ports onto the appropriate network to which it is linked. There are 3 types of routers in the currently performed embodiments: local routers; half routers; and backbone routers.

A local router is a router such as 805, which is used to connect two local networks, such as ETHERNETs 813 and 812, to one another. A half router is used to connect two networks across a communication link such as a phone line via such devices as modems or other high speed transmission devices. An example of a half router is shown as 802. 802 connects token-ring network 811 via communication device 820 across communication link 821. Communication link 821 may be a phone line or another type of communication line. Communication link 821 is then coupled to a second communication device 822 and then to router 801, which is linked to network 100.

Backbone routers are routers such as those shown as 803 and 804 in FIG. 8 which are used to couple a series of local area networks together, such as token-ring network 810 and ETHERNET 812 through a backbone network such as 830. A backbone network is often a higher capacity network than the local area networks discussed herein. The backbone network may be used to couple a high volume of nodes and other networks and provide very high speed transmission rates between networks and nodes. Also, backbone networks may range over a wider geographic area than typical LANs. Certain routers may have the properties of all three types of routers. Notice that 801 is coupled not only to a local area network making it a local router, but is also coupled to the backbone network and a communication link, giving it the properties of a backbone router and a half router.

Each router in the internet maintains certain information about its local environment and other routers on the internet. Each router has several ports or connections to the other networks or communication links to which it is connected. For each of the ports, information is maintained about the networks connected to each port. For instance, for router 801, information is maintained about each of the ports 104, 850, and 851 to which it is connected. The information is known as a "port descriptor" and consists of the following four fields:

1. a flag indicating whether the port is connected to an AppleTalk ® network or not;
2. the port number;
3. the port node address (the router's node address in the network coupled to the port); and
4. the port's starting and ending network numbers (the starting and ending range of network numbers for the LAN connected to the port, a value referred to in the router as THIS-NETWORK-RANGE).

Each router does not need to have a THIS-NETWORK-RANGE value associated with it. At least one router on the local network (called the seed router) has a THIS-NETWORK-RANGE built into its port descriptor. The other routers on the network may acquire their network range by communicating with the seed router. Other routers on the local network may have a value of 0 in THIS-NETWORK-RANGE, but may not have a network range that conflicts with the seed router's THIS-NETWORK-RANGE. Although each router maintains a range of valid network numbers for the port in the preferred embodiment, in an alternative embodiment, the router may maintain a list of network numbers that reside on the given port.

In addition to maintaining a port descriptor for each port to which the router is connected, each router also maintains a routing table used to forward data packets for another network in the internet. For instance router 801 will maintain a routing table telling it where various networks in the internet, such as 812 and 811, may be reached. The routing table is essentially a list of networks connected through each of the router's ports, the network number range of each of these networks, the distance of each network away from the router measured in terms of hops (the minimum number of routers a datagram must traverse to reach the router) and the network number and node ID for the next IR through the given port. Therefore, when a router obtains a packet addressed to a network number and node ID that is not directly accessible through one of its ports, the packets is then forwarded through that port to the next IR on the path to the destination network so that the appropriate node will eventually receive the data packet.

Figure 9:
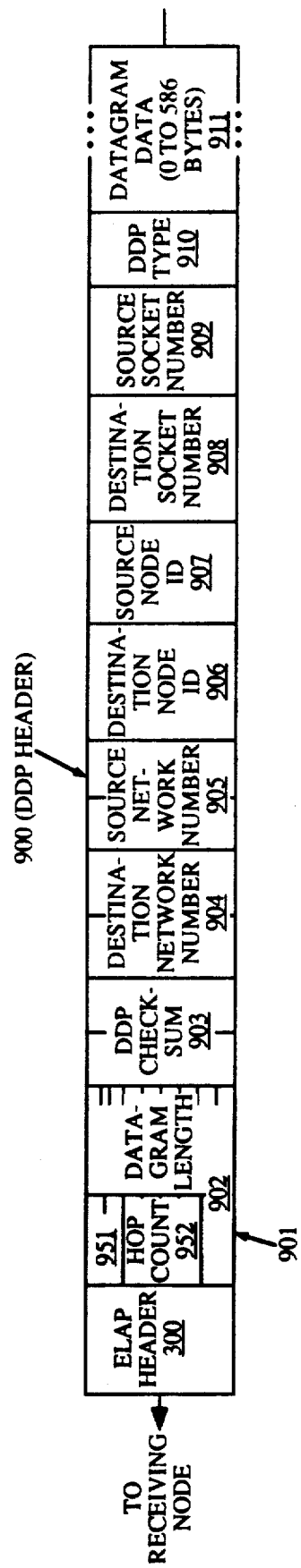
FIG. 9 shows a packet used for transmittal of data from one node in the internet to another node.

Additional information used for transmitting information between nodes in the internetwork is shown as 900 in FIG. 9. This detailed representation is the header information used by the Datagram Delivery Protocol 409 (DDP). This header is used at the network protocol stack level 410 shown in FIG. 4. The packet is part of the data field 308 of the ELAP packet 300. Note that the ELAP packet 300 may be packet 350 for a Token-ring system, in an alternative embodiment wherein 900 is part of data field 359. The next field 901 includes a hop count field 952 in its middle four bits. The two least significant bits of byte 901 are part of the next field 902. In the preferred embodiment the hop count 952 is initially set to zero at the source node and is incremented by one each time the packet traverses a router as shown in FIG. 8. If the hop count reaches a value of $F or 15 (decimal), then the packet is discarded (no longer forwarded) by the routers in the internet. This is because in the preferred embodiment, the number of "hops" or internet routers a packet may traverse is limited to 16.

Figure 10:
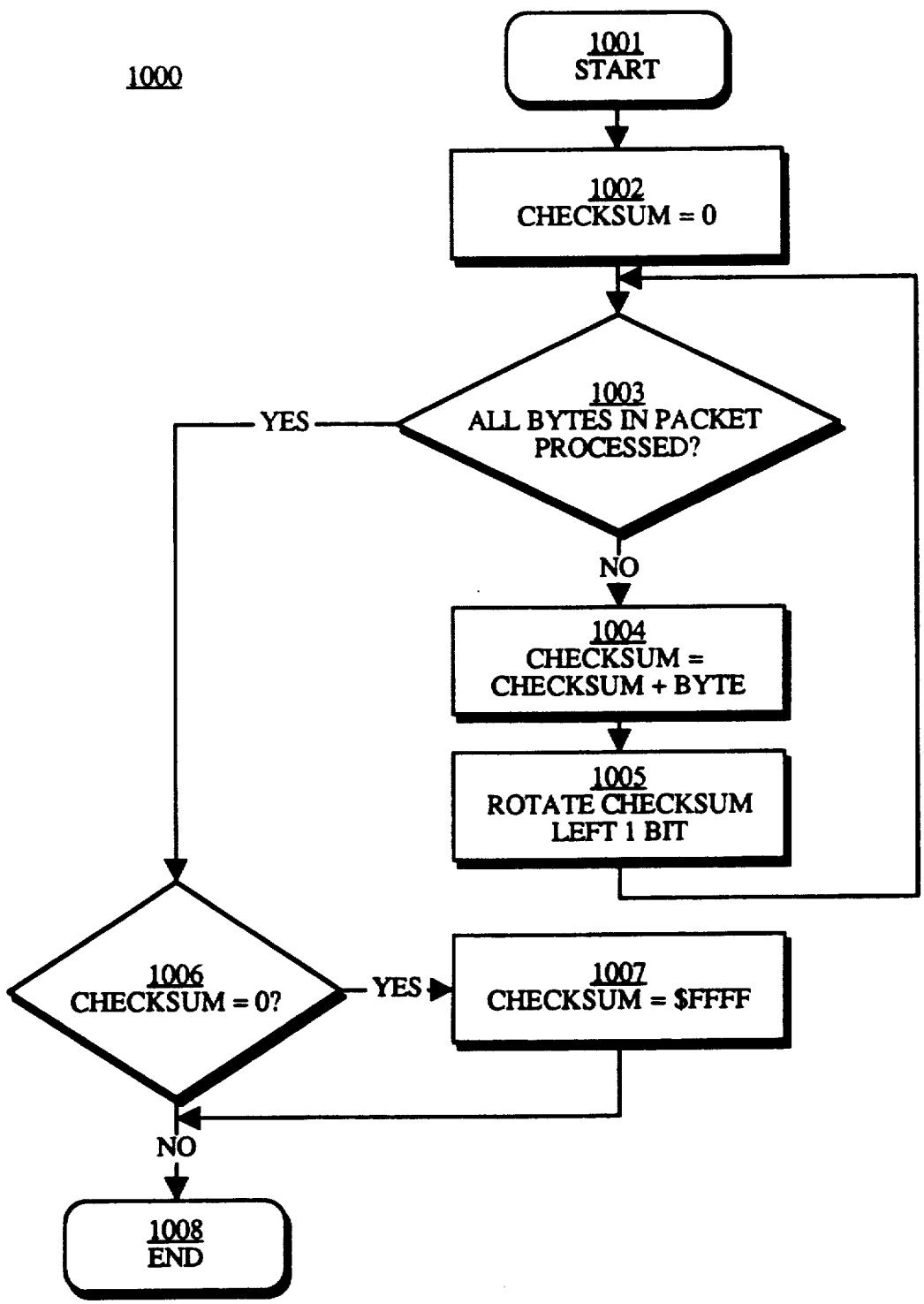
FIG. 10 shows the process of generating a checksum used in the preferred embodiment.

The next field in DDP packet 900 is the datagram length 902. 902 comprises the full length of datagram 911 (whose value may range between zero and 586). Datagram 911 is a part of field DDP packet 900 and contains certain data. The next field contains a DDP checksum 903 and is used for maintaining the integrity of the datagram if the sending node desires a checksum. The checksum computation process is shown in FIG. 10. The checksum is computed by totalling each byte of the datagram and then rotating the checksum one bit to the left for each byte totalled. Upon receiving the packet, a destination node if the source node uses checksum field 903, may compute the checksum and determine whether the datagram received has been damaged in transit. 904 and 905 are the destination and source network numbers, respectively, each two-bytes in length. These are the network number portions of the protocol addresses of the source and destination nodes. 906 and 907 are the source and destination node IDs, respectively, for that portion of the protocol address.

The next two fields 908 and 909 of the DDP header 900 are the destination and source socket numbers. A socket is often identified with a process in a node. DDP, therefore, allows process-directed datagram transmission. These sockets are each represented by one byte of information, and can be thought of as an extension of the 24-bit protocol address or concatenated network number and node ID. The last field in the DDP header 900 is the DDP type 910 of the datagram data contained within field 911.

The DDP packet 900 is built by the DDP process 409 residing in each node on the network. The datagram 911 will be transmitted either directly to the node on the local network or to a router connected to the local network (A-ROUTER) for transmission to a node elsewhere in the internet. This is accomplished by determining whether the destination network number is in the local network range (THIS-NETWORK-RANGE). If it is, then the datagram is sent directly to the destination node. This is done by inserting the hardware destination address in the ELAP field 301 shown in FIG. 3 (acquired from AARP) and transmitting the packet to the destination node. If, however, the destination network number is not in THIS-NETWORK-RANGE, then the DDP process 409 knows that the destination node is on another network, and the packet must be transmitted to A-ROUTER. A-ROUTER may be any router within the local network which has a port to another network. As a result, field 301 will contain the hardware address for A-ROUTER (obtained from AARP) if the node is not in the local network. When A-ROUTER receives the datagram, it will forward the datagram according to the DDP information given in 900 shown in FIG. 9 by building a new ELAP header 300 containing either the destination hardware address for the node on the local network or the next A-ROUTER in the internet.

Figure 11A:
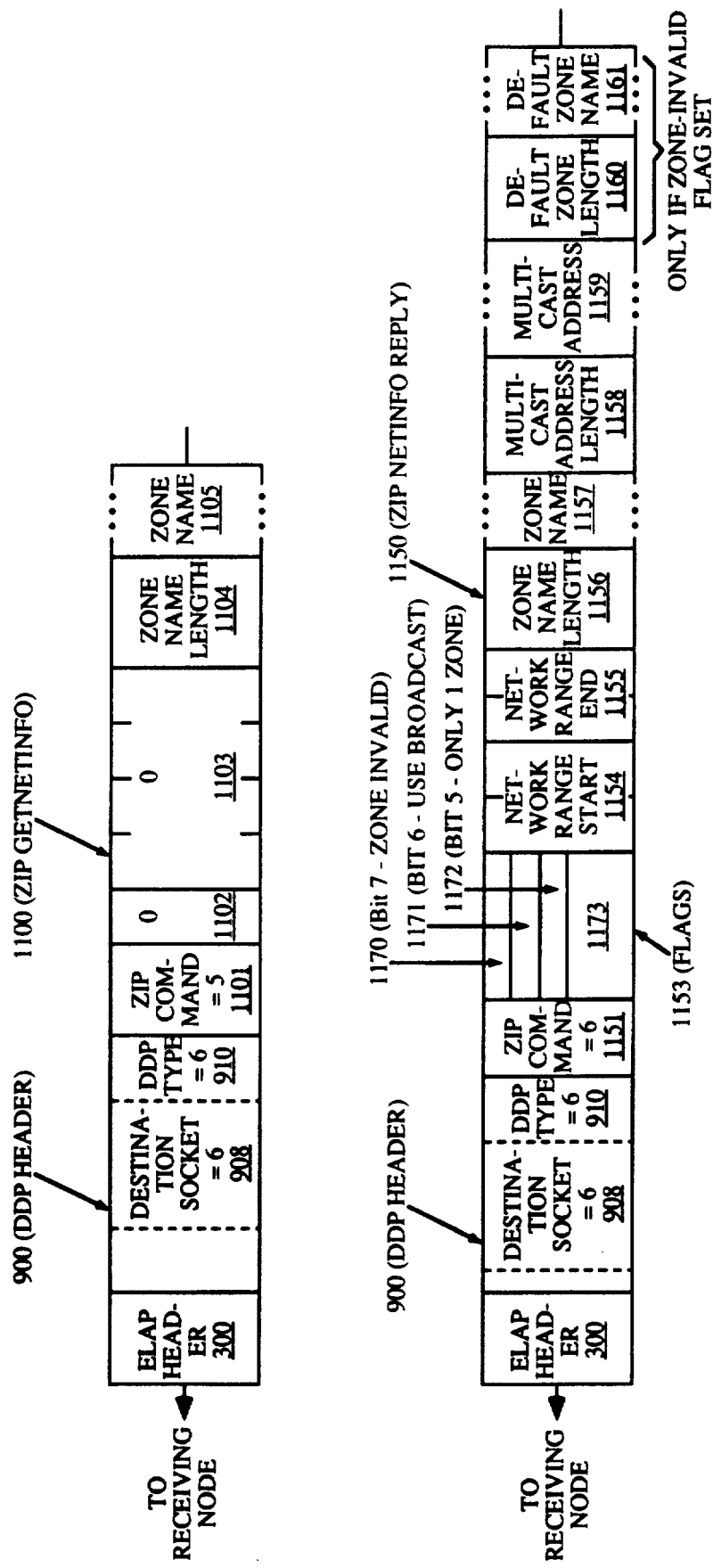
FIG. 11 shows packets used to transmit information to and from a router and nodes in the preferred embodiment for obtaining network information.
Figure 11B:
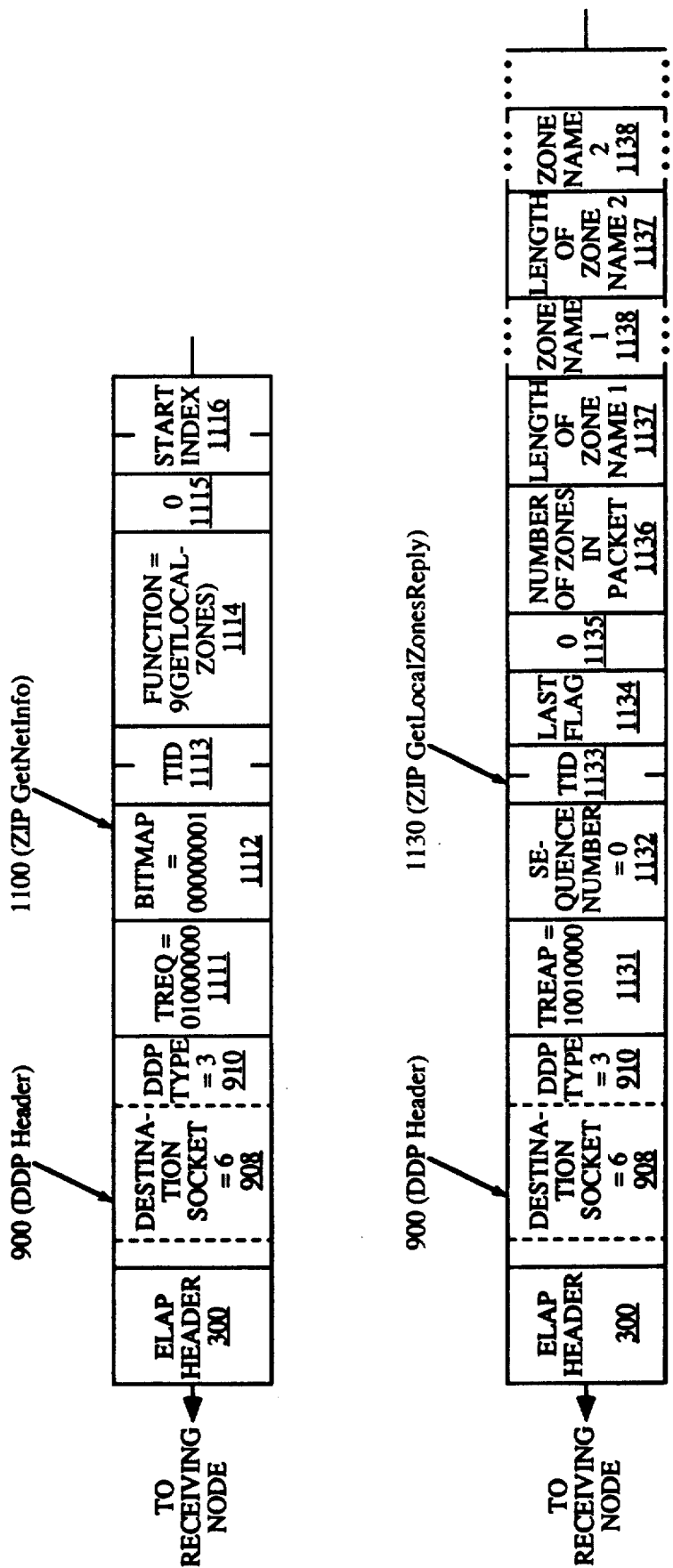

In addition to maintaining information about the router's ports using a port descriptor and the networks coupled to each port using a routing table, the router also maintains a list of "zones" residing on the internet. This list of zones is maintained using the Zone Information Protocol 418 (ZIP). This ZIP 418 resides at the session level 416 of the ISO-OSI model shown on FIG. 4. A zone is an arbitrary subset of nodes within the internet. ZIP process 418 keeps track of the zones in the internet through the use of a Zone Information Table (ZIT) consisting of entries for each network in the internet, indicating which zones are associated with that network. The ZIT is maintained by a ZIP process residing in the router. The ZIP process also responds to queries about zones by nodes in the network. The ZIT is maintained by the ZIP process, in conjunction with the routing table, so that there is one entry for each network in the internet. One query sent to the ZIP process by nodes is a ZIP GetNetInfo packet 1100 shown in FIG. 11. This packet requests zone information from the router. The router can respond with a ZIP NetInfoReply packet 1150 shown in FIG. 11. The ZIP GetNetInfo packet 1100 in FIG. 11 is known as a port-dependent request (it gives information about the LAN connected to the port from which the request came). The router will respond to a ZIP GetNetInfo packet 1100 with a ZIP NetInfoReply packet 1150.

The ZIP GetNetInfo packet 1100 in FIG. 11 will take the place of the datagram data field 911 shown in FIG. 9 and is part of the ELAP packet 300 and the DDP packet 900. TLAP packet 350 may be used place of ELAP packet 300 in an alternative embodiment wherein the DDP packet 900 and the ZIP GetNetInfo 100 will reside in data field 359 of TLAP packet 350. Field 908 of the DDP header for all of the ZIP commands contains a six and field 910 contains a six. The first field 1101 in packet 1100 contains five, indicating that this is a ZIP GetNetInfo packet. 1102 and 1103, the next five bytes of packet 1100 are ignored by the ZIP process in the router. The zone name length, byte 1104, specifies the length of the zone name in field 1105 and is the zone name for which information is sought. If the requesting node does not know a zone name at the time the ZIP GetNetInfo 1100 is transmitted, then field 1104 contains zero and zone name field 1105 is not used.

In response to a ZIP GetNetInfo 1100 received, the router will provide zone information using a ZIP NetInfoReply 1150 shown in FIG. 11. ZIP NetInfoReply 1150 is part of ELAP packet 300 and DDP header 900. The ZIP command field 1151 contains six, indicating that this is a ZIP NetInfoReply. The next field 1152 is a single byte comprising flags 1171, 1172 and 1173, bits 7, 6 and 5, the high order bits, respectively. The flag bits, when set, each have a predetermined meaning, as follows:

- bit 7—1170, indicates that the zone name requested is invalid for the network from which the request came;
- bit 6—1171, indicates that the node should use the data link broadcast address because the link does not support multicast; and
- bit 5—1172, indicates that the network has only one zone.

The remaining portion 1173 of the flags field 1153 is not used.

The next 2 byte field 1154 is used to return the starting network number for the network connected to the port from which the request was received. As mentioned previously, each port on an IR has a network range known as THIS-NETWORK-RANGE associated with it in the preferred embodiment. In an alternative embodiment, the router may simply keep a list of network numbers which are connected to the router. The THIS-NETWORK-RANGE used in the preferred embodiment is contiguous. Field 1154 represents the beginning of the network number range, and field 1155 represents the end of the network number range. Both 1154 and 1155 are two bytes in length. The next one byte field 1156 is used for representing the length of the zone name 1157 returned to the requesting node. Field 1157 contains the zone name, if any, which is returned to the requesting node. The zone name is returned if the requesting node provided a zone name or the network resides in only one zone. A network residing in only one zone is indicated by bit 1172 being set in the packet. Fields 1158 and 1159 are the multicast address length and the multicast address, respectively, for the zone name returned in field 1157. If bit 1171 (bit 6) is set in the ZIP GetNetInfo packet 1100, then the multicast address field 1159 will be not be used and the multicast address length 1158 will contain zero.

The multicast address provided in field 1159 of ZIP NetInfoReply 1150 is used to send data packets to nodes residing in a specific zone. A multicast address is associated with each zone name on a given network so that nodes residing in the zone will receive the packet and nodes not residing in the zone will generally not need to process the packet in any way. The multicast address is derived from the zone name by the router using the same process 1000 in FIG. 10 to compute the datagram checksum. In this case, however, the zone name (an ASCII string between 1 and 32 characters in length, excluding the length field) is converted to uppercase and is used byte-by-byte for computation of an index into a hash table. Once the hash value H, derived from the checksum process, has been determined, the value is used for a look-up into an ordered list of zone multicast addresses. If there are N zone multicast addresses in the table, (address $A_0$–$A_{N-1}$) then the multicast address associated with H is the element $A_{H\ mod\ N}$ wherein mod is the modulo function (the remainder in a whole number divide when H is divided by N). In general, N should be a prime number so that the zone name hashes evenly into a zone multicast address.

The multicast capability is provided by the underlying ETHERNET or Token-ring hardware. In the preferred embodiment, using ETHERNET hardware, the multicast addresses in the hash table range from $090007000000($A_0$)$ to $0900070000FC($A_{252}$)$. In the Token-ring system of the alternative embodiment, the addresses in the hash table range from $C00000000800($A_0$)$, $C00000001000($A_1$)$ to $C00020000000($A_{18}$)$.

A broadcast address, in contrast, is an address to which a packet is sent, such that the packet is received by all nodes on a network. The broadcast address for AppleTalk ® is network $0000, node $FF. This protocol broadcast address may be translated into an ETHERNET broadcast address ($090007FFFFFF) in the preferred embodiment, or a Token-ring broadcast address ($C0040000000) in an alternative embodiment. Network specific broadcasts may also be accomplished wherein the node ID portion of the protocol address is set equal to $FF, for the particular network number comprising the remainder of the protocol address. In other words, only nodes with a certain network number in their protocol address will receive the packet.

Fields 1160 and 1161 of packet 1150 contain a default zone name 1161, and the length of the default zone name 1160. A default zone is one in which all nodes on a network not otherwise assigned a zone reside. These fields are used only if the "zone invalid" bit 1170 has been set in packet 1150, indicating that the requested zone does not exist for the requested network. In the case that the requested zone does exist, these fields do not exist.

The process of the present invention is described with reference to FIGS. 12A-12C. Process 1200 in FIGS. 12A-12C sets forth the preferred embodiment of the present invention. The process of the preferred embodiment allows a node to assign a unique protocol address to itself during node power-up or restart. Sometimes, a network will lose power for a short duration of time or a node will be switched off and that node will have its last protocol address (the concatenated network number and node ID) saved in an area of computer memory known as parameter random access memory (pRAM). Process 1200 starts on FIG. 12A at step 1201 and proceeds at 1202 to determine if a previous protocol address has been saved in pRAM. If the protocol address has been saved in pRAM, then it is checked at step 1206 to see whether another node is using the protocol address for its identification by transmitting an AARP probe 640 shown in FIG. 6. AARP probes 640 are retransmitted approximately ten times to ensure receipt by all nodes on the LAN. At step 1207, if the address is already in use (as indicated by the receipt of an AARP reply packet 620 to the AARP probes 640), process 1200 proceeds to step 1208 to determine whether all valid node ID's of the address from pRAM have been checked for one network number (valid node ID's are those in the range $01 to $FD inclusive since $00, $FE, and $FF are reserved). Step 1208 proceeds to step 1203, which will behave as if no address were stored in pRAM if all of the valid node ID's for one network number have been tested. This node ID cycling randomly picks node ID's which are in the valid range and which have not been checked for the network number obtained from pRAM. At step 1209, if all of the node ID's have not been checked for the network number, the network number is kept constant and another node ID is checked to determine if any other nodes are using it. Steps 1206-1209 are repeated until a protocol address (the network number and node ID) is determined to be available at step 1207 (in which case proceed to step 1210) or until all of the valid node ID's have been checked for the network number stored in pRAM, as determined at step 1208. AARP probes 640 are sent by the node until the node fails to receive an AARP response 620 within a specified period of time. If an AARP response 620 is received, this indicates that the address selected is already in use and the node must select another.

If step 1202 detects that an address has not been saved in pRAM or if all node IDs for the network number portion of the address is in use, then process 1200 proceeds to step 1203 and picks a network number in the start-up range and a node ID, the combination of which was not chosen before. The network number portion of the address must be in the start-up range (between $FF00 and $FFFE). This is because the addresses in the range 1 to FEFF are reserved for use as actual network numbers after startup and $0000 and $FFFF are reserved.

The node ID, or the remaining eight bits of the protocol address, may be any value except $00, $FE and $FF. Therefore, the address to be tried (concatenated network number and node ID) must be of the form $FFXXYY (except $FFFFYY) where XX is the least significant bytes of the network number and YY is the node ID. After determining a legal address, AARP probes 640 are sent by the node at step 1204 to see if the address is in use by another node on the local network. If the address is in use, as detected at step 1205 by the receipt of an AARP response 620, process 1200 randomly picks another address in the valid start-up range at step 1203 that was not chosen before. Of course, any addresses already tried are not selected again and addresses not in the startup range are not selected. Steps 1203 through 1205 are repeated until a provisional protocol address is found that is not in use. If step 1205 determines that the address is not in use, then process 1200 proceeds to step 1210.

Figure 12A:
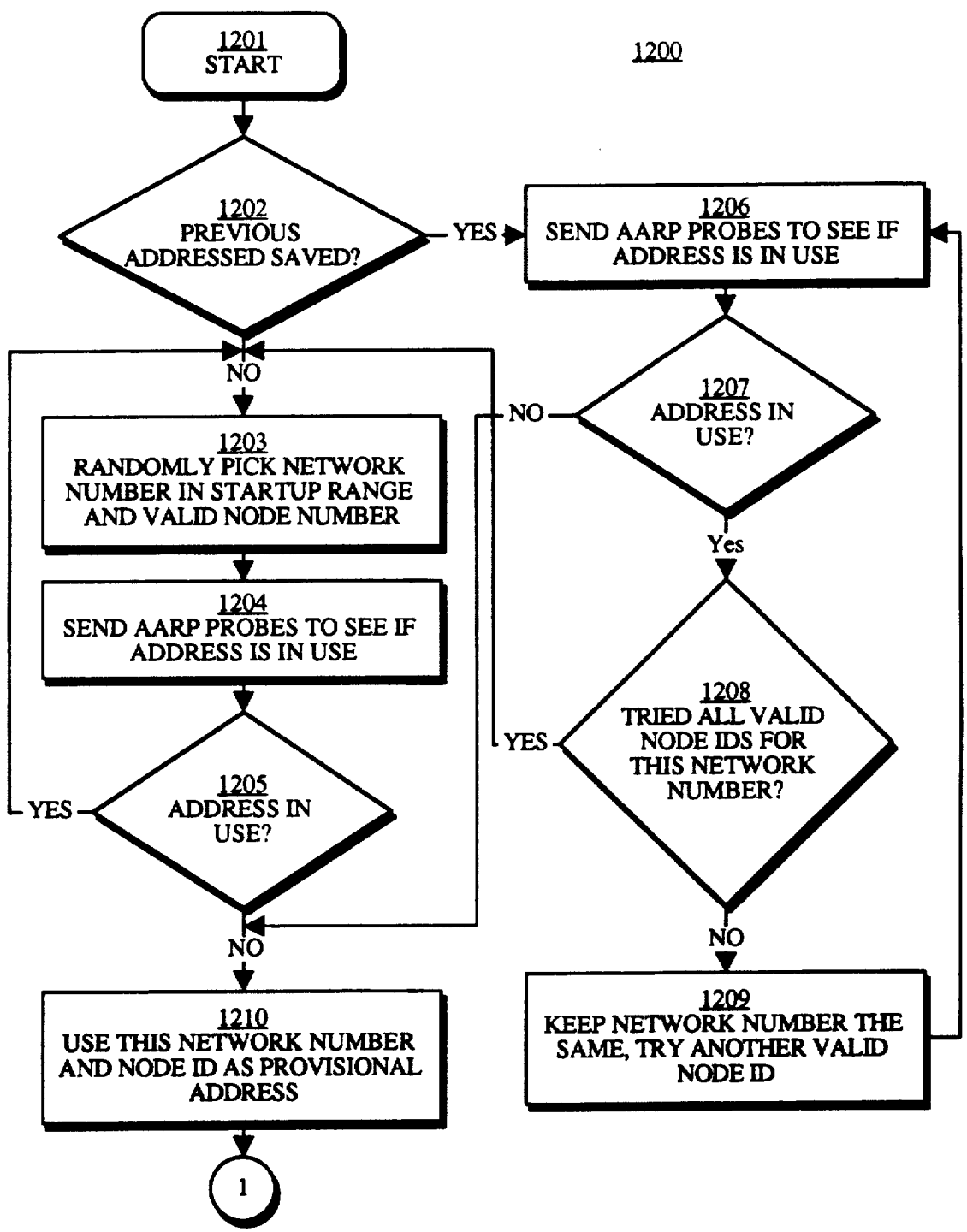
FIGS. 12A, 12B, and 12C show the process used in the preferred embodiment for assigning protocol addresses to nodes in the preferred embodiment.
Figure 12B:
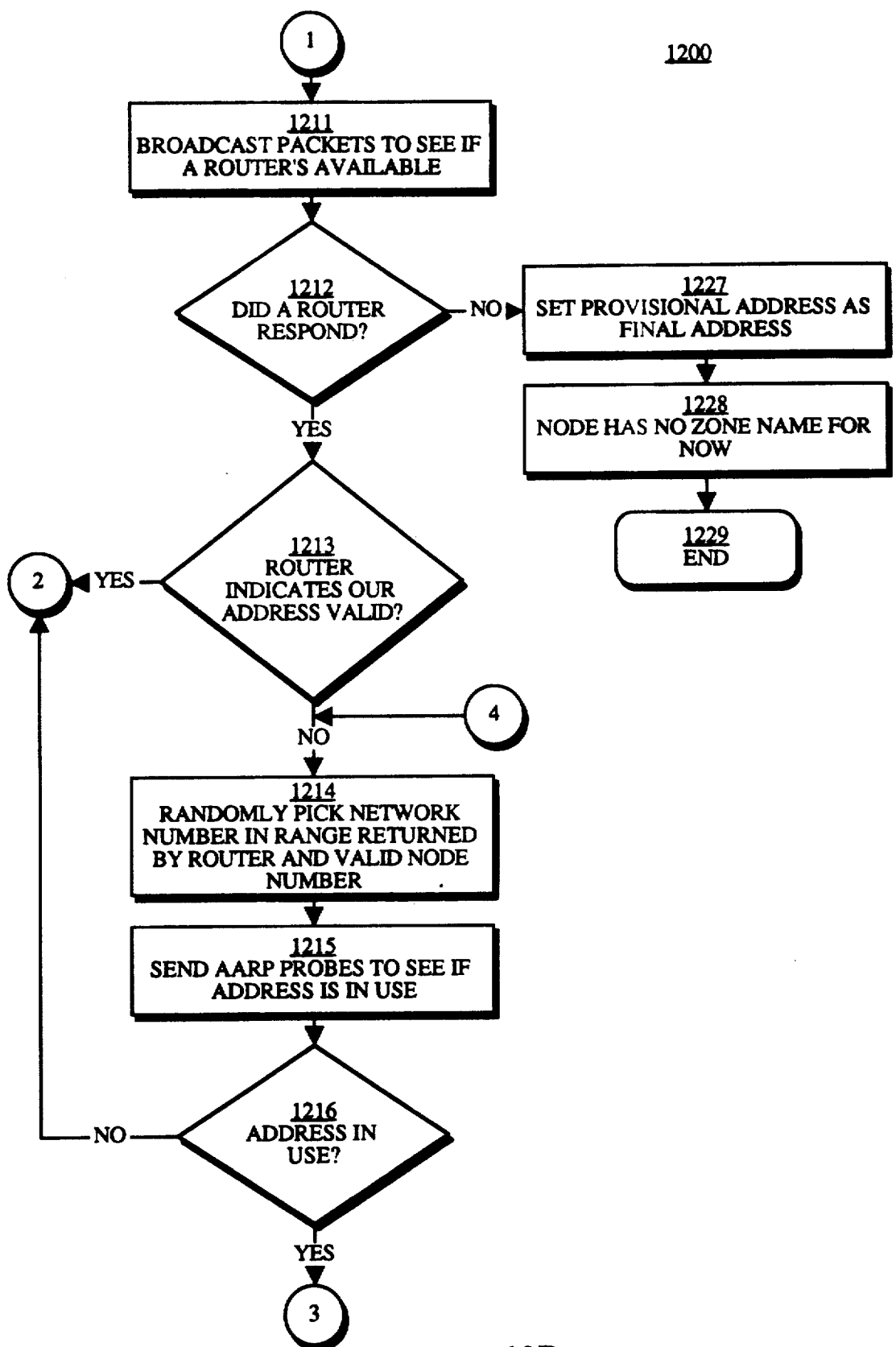

At step 1210 in FIG. 12A, the network number and node ID can now be used as the node's provisional address. Process 1200 proceeds to step 1211 in FIG. 12B. Step 1211 broadcasts a ZIP GetNetInfo 1100 as shown in FIG. 11, to see if a router is available and can provide network information. If a ZIP NetInfoReply 1150 is received within a determinate period of time, as detected at step 1212, process 1200 proceeds to step 1213. If, however, after retransmitting ZIP GetNetInfo packets 1100 approximately three times and a router does not respond within a determinate period of time, it is assumed that there is no active router connected to the local network, and process 1200 proceeds to step 1227. Step 1227 uses the provisional address as the node's final address and the zone name is left undetermined for the node at step 1228. Process 1200 then ends at step 1229.

If a router did respond, however, step 1213 checks the information returned in the ZIP NetInfoReply 1150 received from the router to determine whether the selected provisional address is within the valid range of network numbers (THIS-NETWORK-RANGE) returned in fields 1154 and 1155 of ZIP NetInfoReply 1150. If the provisional network number is within THIS-NETWORK-RANGE, then process 1200 proceeds to step 1220, as shown in FIG. 12C. If the address is not in the range returned in ZIP NetInfoReply 1150, process 1200 proceeds to step 1214 and selects a network number in the range returned by the router, and a node ID. At step 1215, process 1200 again sends AARP probes 640 to determine if the address is in use. If the node ID and network number chosen in step 1214 is in use on the LAN(if an AARP response 620 is received), process 1200 proceeds to determine at step 1217 in FIG. 12C whether all of the addresses (network number and node ID pairs) in THIS-NETWORK-RANGE have been checked. If all of the addresses in THIS-NETWORK-RANGE have been checked, process 1200 proceeds to step 1218 in FIG. 12C and generates an error condition, terminating process 1200 at 1219 (there are no available node IDs left). However, if all the addresses with the network number in THIS-NETWORK-RANGE have not been checked, process 1200 proceeds at step 1217 to step 1214, which again randomly selects a network number and node ID(not selected before) and broadcasts AARP probes 640 at step 1215.

Figure 12C:
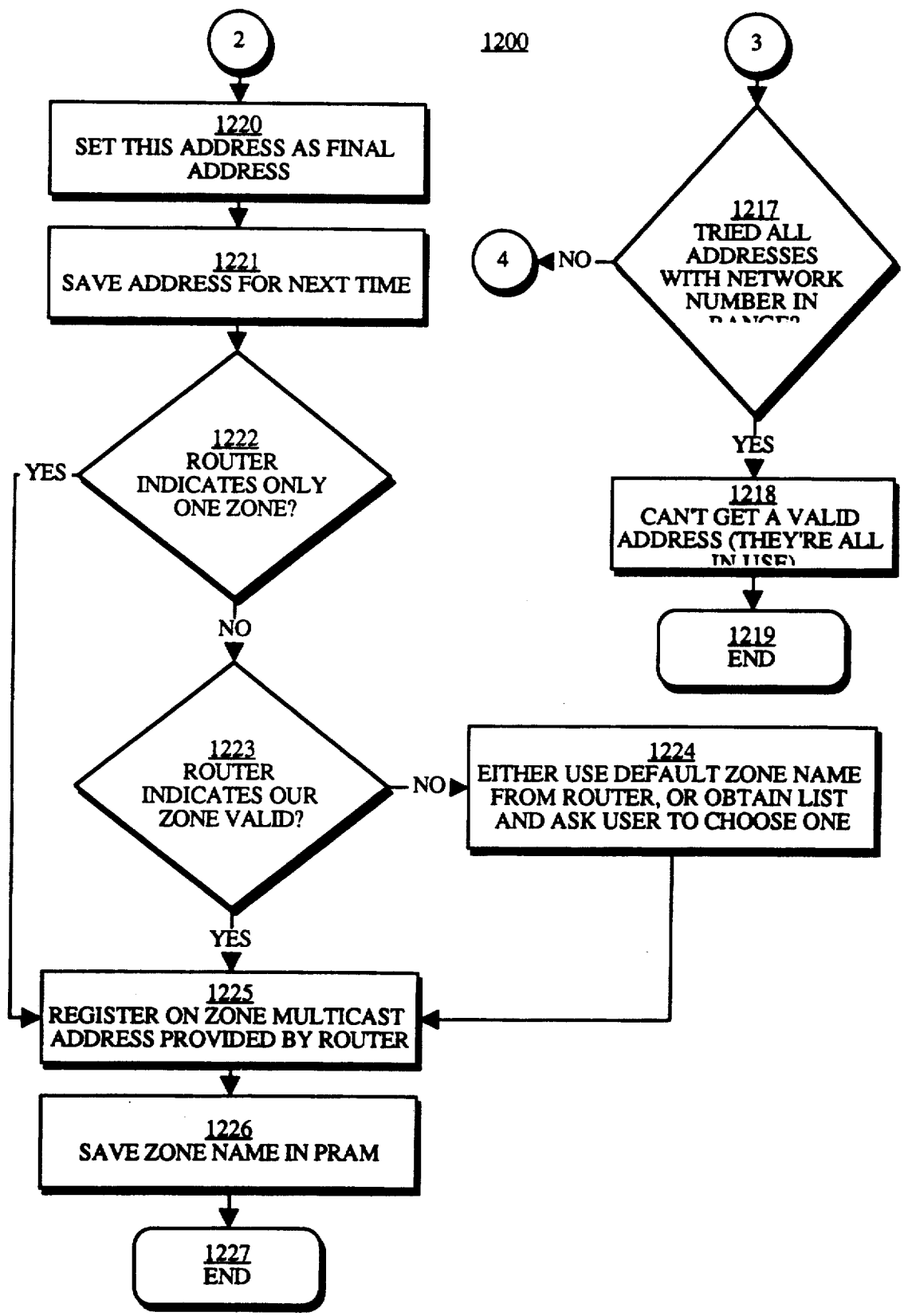

At step 1216, if the address is determined to not be in use and it is in THIS-NETWORK-RANGE, then process 1200 proceeds to step 1220 in FIG. 12C. Step 1220 then uses this address as the final protocol address for the node. From that point on, the router and any node wishing to communicate with the node will use this 24-bit protocol address as the destination protocol address in the DDP fields 904 and 906 for packets transmitted on the internet. At step 1221, the protocol address is also saved in the node's pRAM in case of a power interruption or system restart so that the node may more efficiently reassign its protocol address in the manner discussed above.

Steps 1222-1226 deal with the assignment of a zone information for the node. The node's ZIP GetNetInfo packet 1100 transmitted to the router also contained the node's last saved zone name from pRAM, if there was any. The router's ZIP NetInfoReply packet 1150 indicated whether this zone name was valid for the node's network. At 1222, if the router indicates that there is only one zone on the network by bit 1172 of the NetInfoReply 1150 being set, then process 1200 proceeds to 1225 and registers the node on the zone multicast address for the zone name provided in field 1159 of ZIP NetInfoReply 1150. In this case, process 1200 then proceeds to save the zone name at step 1226 and ends at step 1227. However, if at step 1222, bit 1172 is not set (indicating that there is more than one zone on the port) step 1222 proceeds to step 1223 and determines whether the zone entered in field 1105 of ZIP GetNetInfo 1100 is valid. If bit 1170 of ZIP NetInfoReply 1150 is not set, indicating that the zone is valid, then process 1200 proceeds to 1225 and registers the zone's multicast address provided in field 1159 of packet 1150 as the node's multicast address. Process 1200 then saves the zone name at step 1226 and ends at step 1227.

If bit 1170 of packet 1150 is set (the zone name is invalid) then process 1200 proceeds to step 1224 and uses the default zone name returned in field 1161 of packet 1150 or, alternatively, allows the user to choose a zone name from a list of zone names. The list of local zone names is obtained using ZIP GetLocalZones packet 1110, and allows the user to choose a zone name from a list of zone names provided in the plurality of fields 1138 shown on the display. This is done using a dialog box or other technique common in the MACINTOSH. Once a zone is chosen, another ZIP GetNetInfo packet 1100 must be sent to the router to obtain the zone multicast address of the selected zone. After the default zone name has been chosen at step 1224 or a valid zone name has been selected by the user using a dialog box, process 1200 proceeds to 1225 and registers the node on this zone multicast address provided in field 1159 of the ZIP NetInfoReply packet 1150. Step 1225 then proceeds to step 1226 to save the zone name in pRAM and ends at step 1227. After step 1227 has completed, process 1200 is terminated and the node now also has a zone name and a corresponding multicast address associated with it.

Thus, an invention for the self-assigning of a protocol address has been described. Although the present invention has been described particularly with reference to FIGS. 1-12C, it will be apparent to one skilled in the art that the present invention has utility far exceeding that disclosed in the Figures. It is contemplated that many changes and modifications may be made, by one of ordinary skill in the art, without departing from the spirit and scope of the invention, as disclosed above.

What is claimed is:

1. In a communication system for transferring data between a plurality of entities coupled together in said communication system, said communication system including subsets of said plurality of entities which each have at least one routing means interconnecting each of said subsets with other subsets in said communication system, said subsets including a local subset of entities which comprises a first entity, a method used by the first entity for assigning itself a unique address on the communication system, comprising the steps of:
   a. if a first value is stored in a first storage means, then performing the following steps:
      i. storing the first value in a second storage means;
      ii. transmitting a first signal to said local subset of entities to determine if the first value is used for the unique identification of another entity in said local subset of entities;
      iii. if the first value is used for the unique identification of said another entity in said local subset of entities then receiving a second signal from another entity in said local subset of entities within a first predetermined amount of time;
      iv. storing the value in said second storage means in said first storage means;
   b. if the first value has not been stored in the first storage means, or if the first value has been stored in the first storage means and the second signal is received then performing the following steps:
      i. randomly selecting a third value and storing said third value in the second storage means;
      ii. transmitting a third signal to said local subset of entities to determine if the third value is used for the unique identification of said another entity;
      iii. if the third value is used for the unique identification of said another entity then receiving a fourth signal from said another entity in said local subset of entities, randomly selecting a fourth value, storing the fourth value in the second storage means and repeating steps b.ii and b.iii until the fourth signal is not received, the fourth value becoming the third value at the beginning of each repetition of step b.ii;
      iv. storing the value in said second storage means in said first storage means;
   c. transmitting a fifth signal to said local subset of entities to request information from a first routing means coupled to the local subset of entities;
   d. if a sixth signal is received from the routing means within a second predetermined period of time, the sixth signal including a list of values for the local subset of entities, then performing the following steps:
      i. if a first portion of the value contained within the second storage means does not equal one value in the list of values provided in the sixth signal, then randomly selecting a fifth value from the list of values provided in said sixth signal and storing said fifth value in the second storage means;
      ii. transmitting a seventh signal to said local subset of entities to determine if the value contained in the second storage means is used for the unique identification of said another entity;
      iii. if the value contained in the second storage means is used for the unique identification of said another entity then receiving an eighth signal from another entity in said local subset of entities, randomly selecting a sixth value from the list of values provided in the sixth signal, and storing the sixth value in the second storage means, said sixth value having a first portion equivalent to the first portion of said second storage means and repeating steps d.ii and d.iii until the eighth signal is not received or until all possible sixth values have been stored in said second storage means;
      iv. if all possible sixth values have been stored in the second storage means then randomly selecting a seventh value from said list of values in said sixth signal, and storing said seventh value in said second storage means and repeating step d.ii.;
      v. storing the value in said second storage means in said first storage means;
   e. using said value in said first storage means as said unique identification for said first entity.

2. The method of claim 1 wherein prior to performing step b, if the first value has been stored in a first storage means and if a second signal is received then storing a second value in the second storage means, wherein the first and the second values each comprise a network number and node ID (identification) portion, and the network number portion of the first and second values are equal.

3. The method of claim 2 further comprising repeating steps a.ii. and a.iii. until the second signal is not received from another entity in said local subset of entities or until all possible first values have been stored in the second storage means, the second value becoming the first value at the beginning of each repetition of step a.ii.

4. The method of claim 3 wherein step b will be performed if all possible first values have been stored in the second storage means and the second signal is still received from another entity in said local subset of entities.

5. The method of claim 3 wherein if all possible third values have been stored in said second storage means, then indicating an error condition and stopping, wherein the value contained within the second storage means comprises a network number and node ID portion.

6. The method of claim 1 wherein the fifth signal contains zone information obtained from a third storage means and step d further comprises the following step:
  vi. if the sixth signal has been received from the routing means within the second predetermined period of time,
     there is a plurality of zone information indicated by the sixth signal and there is no first zone information contained within the third storage means or the first zone information contained within the third storage means is indicated to be invalid by the sixth signal, then storing default zone information into the third storage means.

7. The method of claim 6 wherein the default zone information is contained in the sixth signal.

8. The method of claim 1 wherein if all possible third values have been stored in said second storage means, then indicating an error condition and stopping.

9. The method of claim 1 wherein if all possible sixth values have been stored in said second storage means, the second storage means comprising a network number and node ID portions, then indicating an error condition and stopping.

10. The method of claim 1 wherein the fifth signal contains zone information obtained from a third storage means and step d further comprises the following step:
  vi. if the sixth signal has been received from the routing means within the second predetermined period of time.
     a. there is a plurality of zone information indicated by the sixth signal and there is no first zone information contained within the third storage means or the first zone information contained within the third storage means is indicated to be invalid by the sixth signal, then transmitting a ninth signal to said routing means, receiving a tenth signal from said routing means, selecting second zone information from a plurality of zone information provided in the tenth signal and storing the second zone information into the third storage means.

11. The method of claim 1 wherein the communication system comprises an ETHERNET networking system.

12. The method of claim 1 wherein the communication system comprises a token-ring networking system.

13. The method of claim 1 wherein the communication system comprises a fiber distributed data interface networking system.

14. The method of claim 1 wherein the first, second, third, fourth, fifth, and sixth values each comprise 24 bits.

15. The method of claim 1 wherein the list of values provided in the sixth signal is a contiguous range of network numbers.

16. In a communication system for transferring data between a plurality of entities coupled together in said communication system, said communication system further including subsets of said plurality of entities which each have at least one routing means interconnecting each of said subsets with other subsets in said communication system, said subsets including a local subset of entities which comprises a first entity, a method used by the first entity for assigning itself a unique address on the communication system, comprising the steps of:
  a. randomly selecting and storing a first value in a first storage means;
  b. transmitting a first signal to the local subset of entities to determine if the first value is used for the unique identification of another entity in said local subset of entities;
  c. if the first value is used for the unique identification of another entity in said local subset of entities then receiving a second signal from another entity and randomly selecting and storing a second value in the first storage means;
  d. transmitting a third signal to said local subset of entities to request information from a routing means coupled to the local subset of entities; and
  e. if a fourth signal is received from the routing means within a predetermined period of time, the fourth signal including a list of values for local subset of entities, then performing the following steps:
    i. if a first portion of the value contained within the first storage means is not in the list of values provided by the fourth signal, then randomly selecting and storing a third value in the first storage means, the third value including a first portion randomly selected from the list of values provided in the fourth signal;
    ii. transmitting a fifth signal to the local subset of entities in said communication system to determine if the value contained in the first storage means is used for the unique identification of another entity in said local subset of entities; and
    iii. if the value contained in the first storage means is used for the unique identification of another entity then receiving a sixth signal from another entity in said local subset of entities, randomly selecting and storing a fourth value in the first storage means, the fourth value including a first portion equivalent to the portion of the value in said first storage means and repeating step e.ii.;
  f. using said value in said storage means as said unique identification for said first entity.

17. The method of claim 16 further comprising repeating steps e.ii. and e.iii. until the sixth signal is not received from another entity in said local subset of said communication system or until all of the possible third values have been stored in the first storage means, the fourth value becoming the third value stored in the first storage means at the beginning of each repetition of step e.ii.

18. The method of claim 17 wherein if all of the possible third values have been stored in the first storage means, then indicating an error condition and stopping.

19. The method of claim 16 wherein the third signal contains zone information obtained from a second storage means and further comprises the following step if the fourth signal has been received from the routing means within the predetermined period of time:

a. if there is a plurality of zone information as indicated by the fourth signal and there is no first zone information contained within the second storage means or the first zone information contained within the second storage means indicated to be invalid by the fourth signal, then storing default zone information into the second storage means.

20. The method of claim 19 wherein the default zone information is contained in the fourth signal.

21. The method of claim 16 further comprising repeating steps a., b. and c. until the second signal is not received from another entity in said local subset of said communication system or until all possible first values have been stored in said first storage means, the second value becoming the first value at the beginning of each repetition of step a.

22. The method of claim 16 wherein the value contained within the first storage means comprises a network number and node identification (ID) portion.

23. The method of claim 16 wherein the third signal contains zone information obtained from a second storage means and further comprises the following step if the fourth signal has been received from the routing means within the predetermined period of time:
 a. if there is a plurality of zone information as indicated by the fourth signal and there is no first zone information contained within the second storage means or the first zone information contained within the second storage means is indicated to be invalid by the fourth signal, then transmitting a sixth signal, receiving a seventh signal, selecting second zone information from a plurality of zone information provided in the seventh signal and storing the second zone information into the second storage means.

24. The method of claim 16 wherein the communication system comprises an ETHERNET networking system.

25. The method of claim 16 wherein the communication system comprises a token-ring networking system.

26. The method of claim 16 wherein the communication system comprises a fiber distributed data interface networking system.

27. The method of claim 16 wherein the first, second, third and fourth values each comprise 24 bits.

28. The method of claim 16 wherein the list of values provided in the sixth signal is a contiguous range of network numbers.

29. In a computer controlled communications system for transferring data between a plurality of entities coupled together in said communication system, said communication system including subsets of said plurality of entities which each have at least one routing means interconnecting each of said subsets with other subsets in said communication system, said communication system including a local subset of entities which comprises a first entity, a method used by the first entity for assigning itself an address on the communication system, said address being unique for said first entitiy in oreder to distinguish said first entity from any other entity on said communication system, said method comprising the steps of:
 a. determining whether a first value has been stored, the first value being representative of a previously saved address, the first value including a first network value and a first node value;
 b. if the first value has not been stored, then performing the following steps:
  i. storing a randomly generated second value in a first storage means, said second value being repesentative of first randomly generated address, said second value including a second network value and a second node value:
  ii. transmitting a first signal to the local subset of entities to determine if the second value is used for the unique identification of said any other entity;
  iii. if the second value is used for the unique identification of said any other entity then receiving a second signal from another entity in said local subset of entities in said communication system which indicates to said first entity that said second value is being used as an address for said any other entity on said communication system, and storing a randomly generated third value in the first storage means, said third value being a second randomly generated address and having a third network value and a third node value;
 c. transmitting a third signal to said local subset of entities to request information from a routing means;
 d. if a fourth signal is received within a predetermined period of time from said routing means, wherein said fourth signal includes information representing a list of network values for said local subset of entities, then performing the following steps:
  i. if the nework value contained within the first storage means is not in the list of network values provided by the fourth signal, then storing a fourth value in the first storage means, said fourth value being representative of a third randomly generated address having a fourth network value randomly selected from said list of network values and a fourth node value;
  ii. if the network value contained within the first storage means is within the list of network value provided by the fourth signal, then setting the value contained within the first storage means as the final address of said first entity in said communication system and storing the final address as said first value so that said first value is available when said method is repeated.

30. A method as in claim 29 further comprising: performing the following steps if the network value contained within the first storage means is not in the list of network values provided by said fourth signal:
 a. transmitting a fifth signal to said local subset of entites to determine if the fourth value is used for the unique identification of said any other entity on said of entities;
 b. if the fourth value is used for the unique identification of said any other entity in said local subset of entities then receiving a sixth signal within a predetermined period of time which indicates to said first entity that said fourth value is being used as an address for said any other entity in said local subset of entities, and storing in said first storage means a fifth value being representative of a fourth randomly generated address having a fifth network value randomly generated within said list of network values and having a fifth node value;
 c. if no sixth signal is received by said first entity within said perdetermined period of time, then setting said fourth value as the final address of said first entity in said communication system and storing said fourth value as said first value so that said first value is available when said method is repeated.

31. A method as in claim 29 wherein if a first value has been stored, then performing the following steps:
   a. transmitting a fifth signal to said local subset of entities to determine if the first value is used for the identification of said any other entity;
   b. if the first value is used for the unique identification of said any other entity then receiving a sixth signal from said local subset entities which indicates to the first entity that the first value is being used as an address for said any other entity on said communication system, and storing a randomly generated fifth value in the first storage means, said fifth value having a randomly generated node value while retaining said first network value;
   c. if the first value is not used for the unique identification of said any other entity then repeating steps c and d of claim 29.

32. In a communication system having a plurality of entities which may be grouped into subsets, including a first subset which comprises a first entity, each subset in said communication system interconnected to one another by a routing means, a method used by said first entity to assign itself a unique identification number comprising the following steps:
   a. determining if a first storage means of said first entity comprises a first value and, if so, then performing the following steps:
      i. transmitting a first signal comprising said first value to the first subset of entities and waiting a first period of time or until a first repsonse is received from one entity in the first subset of entities;
      ii. if a first response is received from one entity in the first subset of entities within the first period of time then randomly selecting and storing a second value in said first storage means, and repeating step a.i., said second value becoming said first value;
   b. if the first storage means does not comprise the first value then performing the following steps:
      i. selecting and storing a third value in said first storage means;
      i. transmitting a third signal comprising said third value to the first subset of entities and waiting a first period of time until a first repsonse is received form one entity in the first subset of entities;
      iii. if a first response is received from one entity in the first subset of entities within the first period of time then randomly selecting and storing a fourth value in said first storage means, transmitting a fourth signal comprising said fourth value to the first subset of entities and repeating step b.ii., said fourth signal becoming said third signal and fourth value becoming said third value;
   c. transmitting a fifth signal to said first subset of entities to determine if a first routing means is present in said first subset of entities;
   d. waiting a second period of time or until a second response is received from said first routing means;
   e. if a second response is received during the second period of time then performing the following steps:
      i. determining if the second response indicates that the first value is valid;
      ii. if the second response indicates that the first value is not valid then randomly selecting a fifth value from a set of values included in said second response, and transmitting a sixth signal including said fifth value to said first subset of entities;
      iii. waiting for a third period of time until the second response is received from said first subset of entities;
      iv. if the second response is received within said third period of time then randomly selecting a sixth value from the set of values comprising said second response, transmitting a seventh signal to said first subset of entities and repeating step e.iii., said sixth value becoming said fifth value; and
   f. storing said first value in the second storage means for use as the first entity's unique identification number.

33. A method in an internet comprising local area networks (LAN's) each interconnected by routers of a first node in a first LAN assigning itself a unique address comprising the following steps:
   a. if parameter memory of said first node already contains a first network address, said first network address comprising a first network number and first node ID,. then performing the following steps until all possible node ID's of said first network number have been checked:
      i. determining whether another node in said first LAN uses said first address as its unique address;
      ii. if another node in said first LAN uses said first network address as its unique address then randomly selecting a second node ID for said first address and repeating step a.i., the second node ID becoming the first node ID;
      iii. using said first network address as a provisional address;
   b. if parameter memoroy of said first node does not already contain a first network address or parameter memory does contain a first network address and all possible node ID's for the first network number have been checked then performing the following steps:
      i. randomly selecting a third network number and third node ID to use as a third network address;
      ii. determining whether any other node in said first LAN uses said third network address as its unique identification;
      iii. if another node in said first LAN uses said third network address as its unique identification then randomly selecting a fourth network address and repeating step b.ii., said fourth network address becoming said third network address;
      iv. using said third network address as the provisional network address for said first node, said provisional network address comprising a provisional network number and provisional network node ID;
   c. determining whether a first router is coupled to the first LAN and if so, performing the following steps:
      i. requesting that the first router provide a list of network numbers which are valid for said first LAN;
      ii. if the provisional network number is not in the list returned from said first router then randomly selecting a fifth network number from the list of valid network numbers and randomly selecting a fifth node ID to use as a fifth network address;

iii. determining whether any other node in said first LAN uses said fifth network address;

iv. if another node in said first LAN uses said fifth network address and all node ID's have not been checked then randomly selecting a sixth node ID to use with said fifth network number to use as a sixth network address and repeating step c.iii., said sixth network address becoming said fifth network address;

v. if all node ID's have been checked then randomly selecting a sixth network number from said list of valid network numbers and randomly selecting a seventh node ID to use as a seventh network address and repeating step c.iii said seventh network address becoming said fifth network address;

vi. using said fifth network address as said provisional network address for said first node; and d. saving said provisional network address in said parameter memory, said provisional network address becoming said unique address for said node.

34. A method a first node in a first LAN assigning itself a unique address comprising the following steps:

a. if parameter memory of said first node already contains a first network address, said first network address comprising a first network number and first node ID, then performing the following steps until all possible node ID's of said first network number have been checked:

i. determining whether another node in said first LAN uses said first address as its unique address;

ii. if another node in said first LAN uses said first network address as its unique address then randomly selecting a second node ID for said first address and repeating step a.i, the second node ID becoming the first node ID;

iii. using said first network address as a provisional address;

b. if parameter memory of said first node does not already contain a first network address or parameter memory does contain a first network address and all possible node ID's for the first network number have been checked then performing the following steps:

i. randomly selecting a third network number and third node ID to use as a third network address;

ii. determining whether any other node in said first LAN uses said third network address as its unique identification;

iii. if another node in said first LAN uses said third network address as its unique identification then randomly selecting a fourth network address and repeating step b.ii., said fourth network address becoming said third network address;

iv. using said third network address as the provisional network address for said first node, said provisional network address comprising a provisional network number and provisional network node ID;

c. determining whether a first router is coupled to the first LAN; and d. if a first router is not coupled to the first LAN then saving said provisonal network address in said parameter memory, said provisional network address becoming said unique address for said node.

* * * * *